US005175868A

United States Patent [19]

Yasuoka

[11] Patent Number: 5,175,868

[45] Date of Patent: Dec. 29, 1992

[54] PORTABLE TRANSMITTER/RECEIVER APPARATUS WITH CODED DATA TRANSMISSION FOR REDUCED INTERFERENCE

[75] Inventor: Tadashi Yasuoka, Kodaira, Japan

[73] Assignee: Citizen Watch Co., Ltd., Nishi-Shinjuku, Japan

[21] Appl. No.: 464,343

[22] Filed: Jan. 12, 1990

[30] Foreign Application Priority Data

Jan. 13, 1989 [JP] Japan .................................... 1-4743

[51] Int. Cl.[5] ........................ G08B 13/14; H04B 1/04; H04B 1/16; H04Q 7/00

[52] U.S. Cl. .................................. 455/38.2; 340/572; 340/573; 340/825.2; 340/825.64; 455/51.1; 455/343

[58] Field of Search ........................ 455/51, 38, 61, 63, 455/343; 340/571, 572, 573, 536, 539, 825.04, 825.14, 825.2, 825.37, 825.45, 825.57, 825.64, 825.49, 825.73, 825.44, 825.48, 825.5, 825.21, 825.72; 370/84, 92

[56] References Cited

U.S. PATENT DOCUMENTS

| | | | |
|---|---|---|---|
| 4,691,382 | 9/1987 | Nakajima | 455/343 |
| 4,703,324 | 10/1987 | White | 340/825.14 |
| 4,755,817 | 7/1988 | Vandenbulcke et al. | 340/825.57 |
| 4,809,299 | 2/1989 | Ho | 375/48 |
| 4,853,692 | 8/1989 | Wolk et al. | 340/573 |
| 4,990,892 | 2/1991 | Guest et al. | 340/573 |
| 5,014,040 | 5/1991 | Weaver et al. | 340/572 |

FOREIGN PATENT DOCUMENTS

| | | |
|---|---|---|
| 2567342 | 1/1986 | France . |
| 63-267025 | 11/1988 | Japan . |
| 63-267026 | 11/1988 | Japan . |
| 63-267027 | 11/1988 | Japan . |
| 2196203 | 4/1988 | United Kingdom . |

*Primary Examiner*—Reinhard J. Eisenzopf
*Assistant Examiner*—Chi H. Pham
*Attorney, Agent, or Firm*—Rogers, Howell & Haferkamp

[57] ABSTRACT

A transmitter/receiver apparatus includes a transmitter and a receiver. The transmitter includes an intermittent signal generator and an intermittent modulator. The intermittent signal generator generates an intermittent signal. The intermittent modulator outputs an intermittent modulated signal, as a radio signal, which is obtained by intermittently modulating a carrier on the basis of the intermittent signal. The receiver includes a synchronization determining circuit and a synchronization detector. The synchronization determining circuit has a receiving circuit for receiving the radio signal from the transmitter and outputting a demodulated signal and is designed to detect the presence/absence of the demodulated signal and output a determining signal. The synchronization detector generates an intermittent sync signal having the same period as that of the intermittent signal from the transmitter, and performs a synchronization detecting operation with respect to the intermittent signal from the transmitter on the basis of the intermittent sync signal and the determining signal from the synchronization determining circuit. The intermittent signal generator of the transmitter generates intermittent signals having intervals which cyclically change.

11 Claims, 12 Drawing Sheets

PORTABLE TRANSMITTER/RECEIVER APPARATUS WITH CODED DATA TRANSMISSION FOR REDUCED INTERFERENCE

BACKGROUND OF THE INVENTION

1. Field of the Invention

The present invention relates to a transmitter/receiver apparatus including a transmitter for intermittently generating a radio signal and a receiver for receiving the radio signal.

2. Description of the Prior Art

With a decrease in size and cost of a transmitter/receiver apparatus, various application products have recently been developed. In addition to conventional pagers (pocket bells) which have been widely used, various new systems have become commercially available. For example, a missing article alarming apparatus (e.g., Japanese Patent Laid-Open (Kokai) No. 60-200395) and a missing child alarming apparatus have become commercially available. The missing article alarming apparatus is designed to prevent valuables, such as a bag, a brief case, and a purse, from being mislaid or lost. This apparatus is designed such that a transmitter is attached to a valuable article, and a compact portable receiver is used to receive a radio wave from the transmitter. When the receiver cannot receive a radio wave from the transmitter, an alarm is generated. The missing child apparatus is designed such that a transmitter is carried by a child, and his/her parent carries a receiver so as to receive a radio wave from the transmitter. When the receiver cannot receive a radio wave from the transmitter, an alarm is generated.

These missing article alarming apparatus and missing child alarming apparatus basically have the same arrangement. According to such a conventional arrangement, as disclosed in Japanese Patent Laid-Open (Kokai) No. 60-200395, when a carrier signal Sc transmitted from a transmitter cannot be received by a receiver, an alarm is generated. In this system, therefore, a radio wave must be transmitted without a pause. However, if the transmitter keeps transmitting a radio wave, the service life of a battery is undesirably shortened because the current consumption of the transmitter is large. In addition, if the receiver is continuously operated, since the receiver also consumes a large amount of current, the service life of a battery is undesirably shortened.

If carrier signals Sc are set to have various frequencies fc in order to prevent radio interference, limitations on mass production are imposed. Therefore, the carrier signals Sc preferably have a single frequency fc in a state wherein only a limited number of types of frequencies are used. In this case, if the carrier signal Sc is continuously transmitted from the transmitter of a missing article alarming apparatus of a given user, radio interference may be caused when the transmitter of a missing article alarming apparatus of another user approaches the receiver of the missing article alarming apparatus of the given user. As a result, even if the transmitter of the missing article alarming apparatus of the given user is moved far away from the user, no alarm may be generated.

In order to solve the above-described conventional problems, the applicant of the present invention has proposed a transmitter/receiver apparatus of an intermittent synchronous reception system using intermittent signals in Japanese Patent Laid-Open (Kokai) No. 63-267025. This transmitter/receiver apparatus has the following arrangement.

In this apparatus, a transmitter includes an intermittent signal generating circuit for generating an intermittent signal having a predetermined period, and a switching means for converting a high-frequency transmission signal into an intermittent transmission signal by using the intermittent signal. A receiver includes a synchronization detecting circuit having an intermittent operation pulse forming circuit for generating an intermittent operation pulse having the same period as that of the intermittent signal so as to determine the presence/absence of the intermittent signal by synchronously detecting the intermittent signal, and a switch means to be controlled by a synchronization detecting signal from the synchronization detecting circuit. The switch means switches the receiver to a continuous operation mode or an intermittent operation mode in accordance with the presence/absence of the synchronization detecting signal. That is, the apparatus comprises the transmitter for transmitting an intermittent radio signal, and the receiver which is designed to continuously detect an intermittent radio signal from the transmitter only during an operation start period. Upon detection of the intermittent signal, the receiver is switched to the intermittent operation mode so as to synchronously detect the intermittent signal. If the distance between the transmitter and the receiver is increased, and no intermittent signal from the transmitter reaches the receiver, the receiver cannot synchronously detect the intermittent radio signal. As a result, a buzzer as an alarming means is operated to inform the user of the receiver that an article or a child is missing.

In addition to the transmitter/receiver apparatus proposed by the applicant of the present inventor, attempts have been made to realize a compact apparatus and a compact, lightweight power source by minimizing the operation time and decreasing the current consumption in such a manner that one or both of a transmitter and a receiver is or are intermittently operated or to effectively use a frequency source by performing transmission/reception of data between a plurality of transmitters/receivers using the same frequency in such a manner that when transmission/reception of data is to be performed between the plurality of transmitters/receivers, each pair of transmitter and receiver performs a transmitting/receiving operation at a predetermined time.

For example, a telemeter for intermittently transmitting/receiving measurement data obtained at a remote location and a paging (pocket bell) system for selectively paging several millions of receivers using a single transmission frequency have been put into practice. For example, a time-divisionally selective paging system as disclosed in Japanese Patent Publication No. 48-39843 and the technique of pocket bells described in National Technical Report, Vo. 1.26, No. 1, February 1980, "New "POCKET BELL" Paging Receiver" are available.

All of the conventional transmitter/receiver apparatuses of an intermittent synchronous reception system for performing an intermittent operation use an intermittent signal having a predetermined period. These apparatuses are satisfactorily effective in terms of a reduction in current consumption and apparatus size, and are considerably effective in terms of prevention of radio interference. With respect to the prevention of radio interference, the conventional apparatuses are not effective enough, and hence radio interference often occurs.

The occurrence of radio interference will be described below with reference to FIGS. 1(*a*) to 1(*d*). FIGS. 1(*a*) to 1(*d*) respectively show the waveforms of intermittent signals transmitted from a transmitter of a synchronous reception system. FIG. 1(*a*) shows the waveform of an intermittent signal transmitted from a transmitter of a given user and having a predetermined period t. FIGS. 1(*b*), 1(*c*), and 1(*d*) respectively show the waveforms of intermittent signals from transmitter/receiver apparatuses used by other users near the given user. More specifically, FIG. 1(*b*) shows the waveform of an intermittent signal from a transmitter having the same period t as that of the transmitter of the given user. FIG. 1(*c*) shows the waveform of an intermittent signal from a transmitter having a period 2t twice that of the period of the transmitter of the given user. FIG. 1(*d*) shows the waveform of an intermittent signal from a transmitter having a period ($\frac{1}{2}$)t half of that of the period of the transmitter of the given user.

As shown in FIGS. 1(*a*) to 1(*d*), all of the conventional transmitter/receiver apparatuses of an intermittent synchronous reception system use intermittent signals having predetermined periods. Therefore, if intermittent signals having the same period t are used by the two apparatuses as shown in FIG. 1(*b*), it is natural that radio interference is caused between intermittent signals Sa1 and Sb1, Sa2 and Sb2, . . . when the phases of the signals come close to each other. Even in the case of the intermittent signal having the period 2t as shown in FIG. 1(*c*), radio interference may be caused between intermittent signals Sa1 and Sc1, Sa3 and Sc2, . . . . Even in the case of the intermittent signal having the period ($\frac{1}{2}$)t as shown in FIG. 1(*d*), radio interference may be caused between intermittent signals Sa1 and Sd1, Sa2 and Sd3, Sa3 and Sd5, . . . .

That is, in the intermittent synchronous reception system, radio interference can be considerably reduced as compared with the continuous reception system. However, since intermittent signals having predetermined periods are used, the phases of the signals tend to come close to each other. In addition, a given intermittent signal is liable to radio interference with an intermittent signal having a period of an integer multiple or an integer part of the period of the given intermittent signal. Therefore, problems are posed in terms of practical applications.

If such transmitter/receiver apparatuses are increasingly used in future, a large number of missing article alarming apparatuses may be simultaneously used in a crowded train, or a large number of missing child alarming apparatus may be used in a crowded place such as an amusement park or a zoo. In such a case, even if the above-described improvement is achieved, radio interference is still liable to occur. Therefore, a great demand has arisen for countermeasures against radio interference along with the widespread use of the apparatuses in future.

SUMMARY OF THE INVENTION

It is an object of the present invention to provide a transmitter/receiver apparatus of an intermittent synchronous reception system which can solve the above-described problems and which can greatly reduce radio interference among a large number of different transmitter/receiver apparatuses by minimizing the probability of radio interference based on the periodic characteristics of intermittent signals.

The object of the present invention can be achieved by using intermittent signals whose time intervals are periodically changed.

DETAILED DESCRIPTION OF THE PREFERRED EMBODIMENT

The present invention will be described below with reference to the accompanying drawings.

Figures 1A, 1B, 1C, 1D:
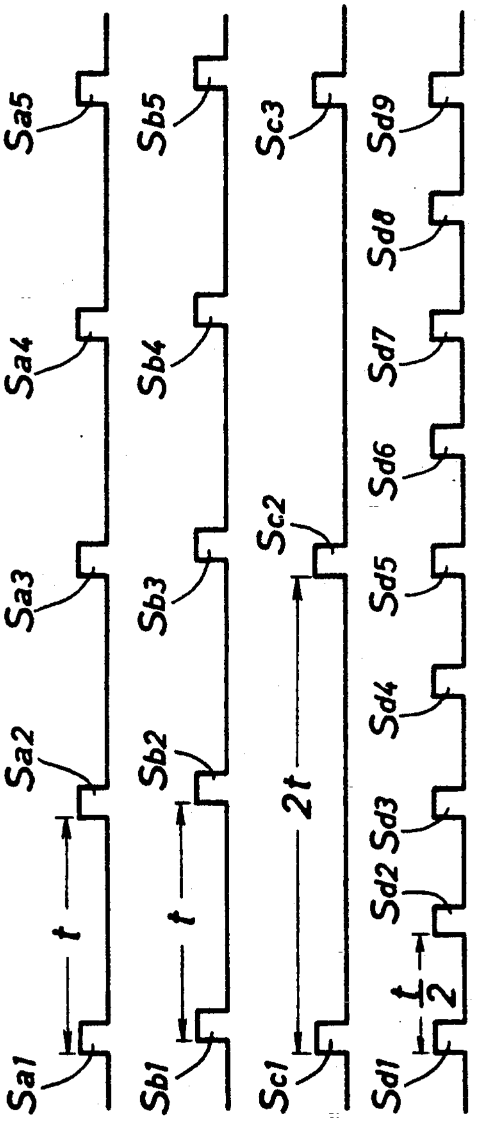
FIGS. 1(*a*) to 1(*d*) are timing charts for explaining the occurrence of radio interference in a conventional transmitter/receiver apparatus of an intermittent synchronous reception system.
Figure 2:
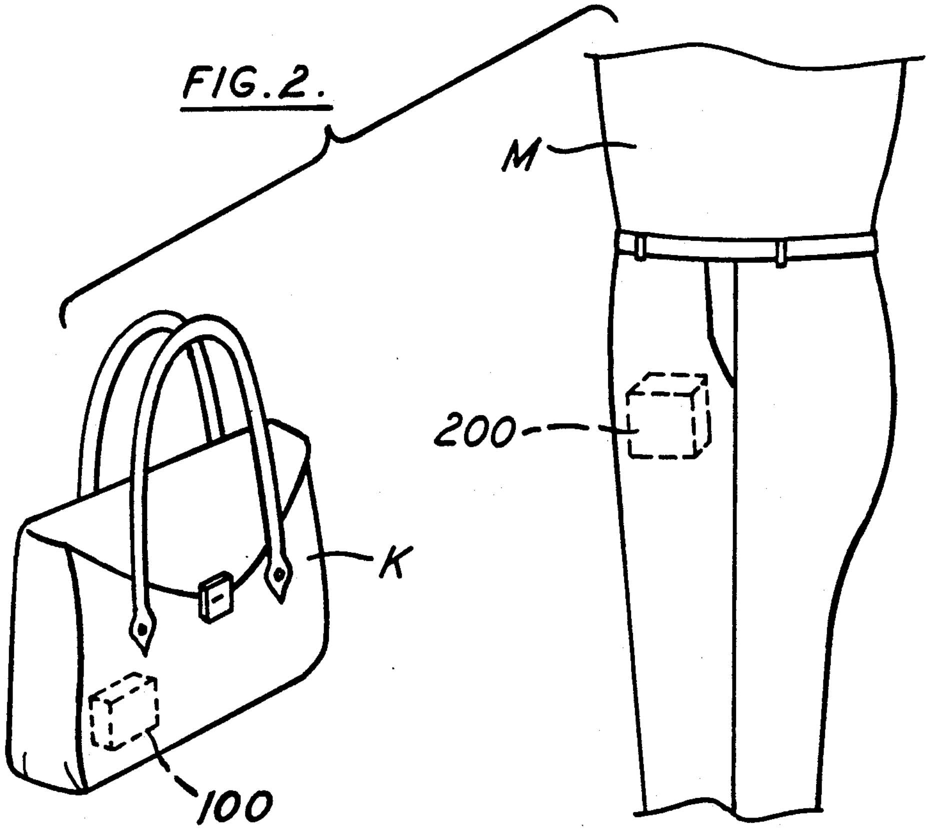
FIG. 2 is a view showing a schematic arrangement of an overall missing article alarming apparatus as a transmitter/receiver apparatus of the present invention.

A transmitter/receiver apparatus of the present invention is used for, e.g., a missing article alarming apparatus. As shown in FIG. 2, the apparatus comprises a transmitter 100 placed in a bag, and a receiver 200 carried by a man M. The receiver 200 is operated upon reception of a radio signal transmitted from the transmitter 100, and generates an alarm when no radio signal is received.

Figure 3:
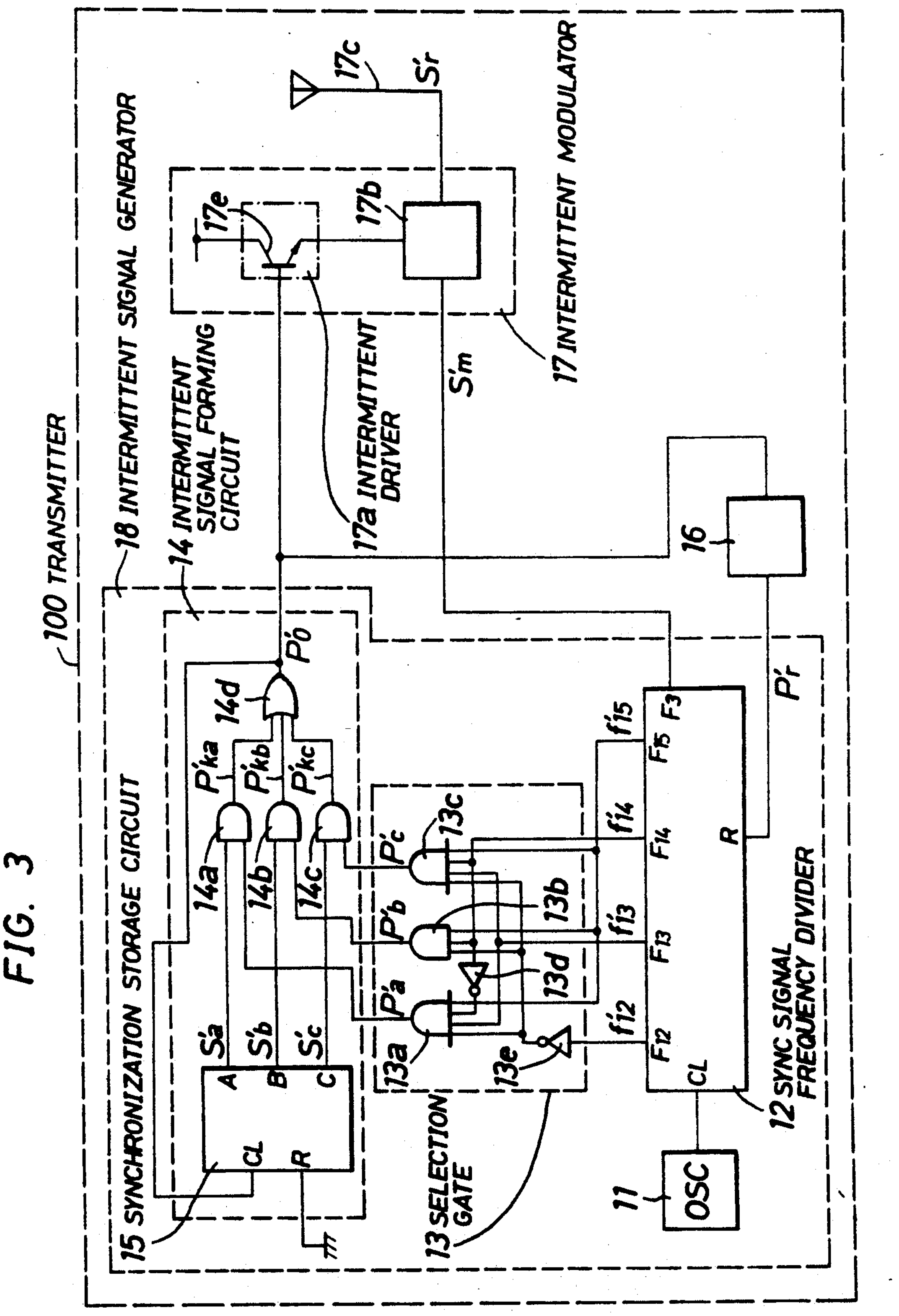
FIG. 3 is a block diagram showing a circuit arrangement of a transmitter, as an embodiment, of the transmitter/receiver apparatus of the present invention.

FIG. 3 shows a circuit arrangement of the transmitter 100 of the present invention. Reference numeral 11 denotes an oscillator (to be referred to as an OSC hereinafter); 12, a sync signal frequency divider; and 13, a selection gate for selecting frequency-divided signals from the sync signal frequency divider 12. The selection gate 13 comprises: an AND gate 13*a* for setting an output signal P'a at logic "1" when frequency-divided signals f'12 and f'14 output from output terminals F12 and F14 of the sync signal frequency divider 12 are at logic "0" and frequency-divided signals f'13 and f'15 output from output terminals F13 and F15 thereof are at logic "1"; an AND gate 13*b* for setting an output signal P'b at logic "1" when the signal f'12 is at logic "0" and the signals f'14 and f'14 are at logic "1"; an AND gate 13c for setting an output signal P'c at logic "1" when the signal f'12 is at logic "0" and the signals f'13, f'14, and f'15 are at logic "1"; an inverter 13d for forming an inverted signal of the signal f'14; and an inverter 13e for forming an inverted signal of the signal f'12.

Reference numeral 14 denotes an intermittent signal forming circuit for forming an intermittent signal P'o by selecting one of the output signals P'a, P'b, and P'c having different timings, which are output from the selection gate 13. The intermittent signal forming circuit 14 is constituted by three AND gates 14a, 14b, and 14c for selecting one of the signals P'a, P'b, and P'c depending on which one of designating signals S'a, S'b, and S'c is set at logic "1", and an OR gate 14d for forming an intermittent signal P'o of logic "1" when one of signals P'ka, P'kb, and P'kc output from the AND gates 14a, 14b, and 14c is set at logic "1".

Reference numeral 15 denotes a synchronous storage circuit for setting one of the designating signals S'a, S'b, and S'c so as to select one of the signals P'a, P'b, and P'c output from the selection gate 13 which is output as an intermittent sync signal P'o.

The OSC 11, the sync signal frequency divider 12, the selection gate 13, the intermittent signal forming circuit 14, and the synchronization storage circuit 15 constitute an intermittent signal generator 18.

Reference numeral 16 denotes a pulse generator for generating a reset pulse P'r by detecting the trailing edge of the intermittent signal P'o. Reference symbol 17a denotes an intermittent driver, constituted by an NPN transistor 17e, for intermittently driving the transmitter by using the intermittent signal P'o; 17b, a transmitting circuit for oscillating a radio signal and modulating it with a modulating signal S'm so as to transmit a high-frequency signal S'r; and 17c, a transmission antenna. The intermittent driver 17a, the transmitting circuit 17b, and the transmission antenna 17c constitute an intermittent modulator 17.

Figure 4:
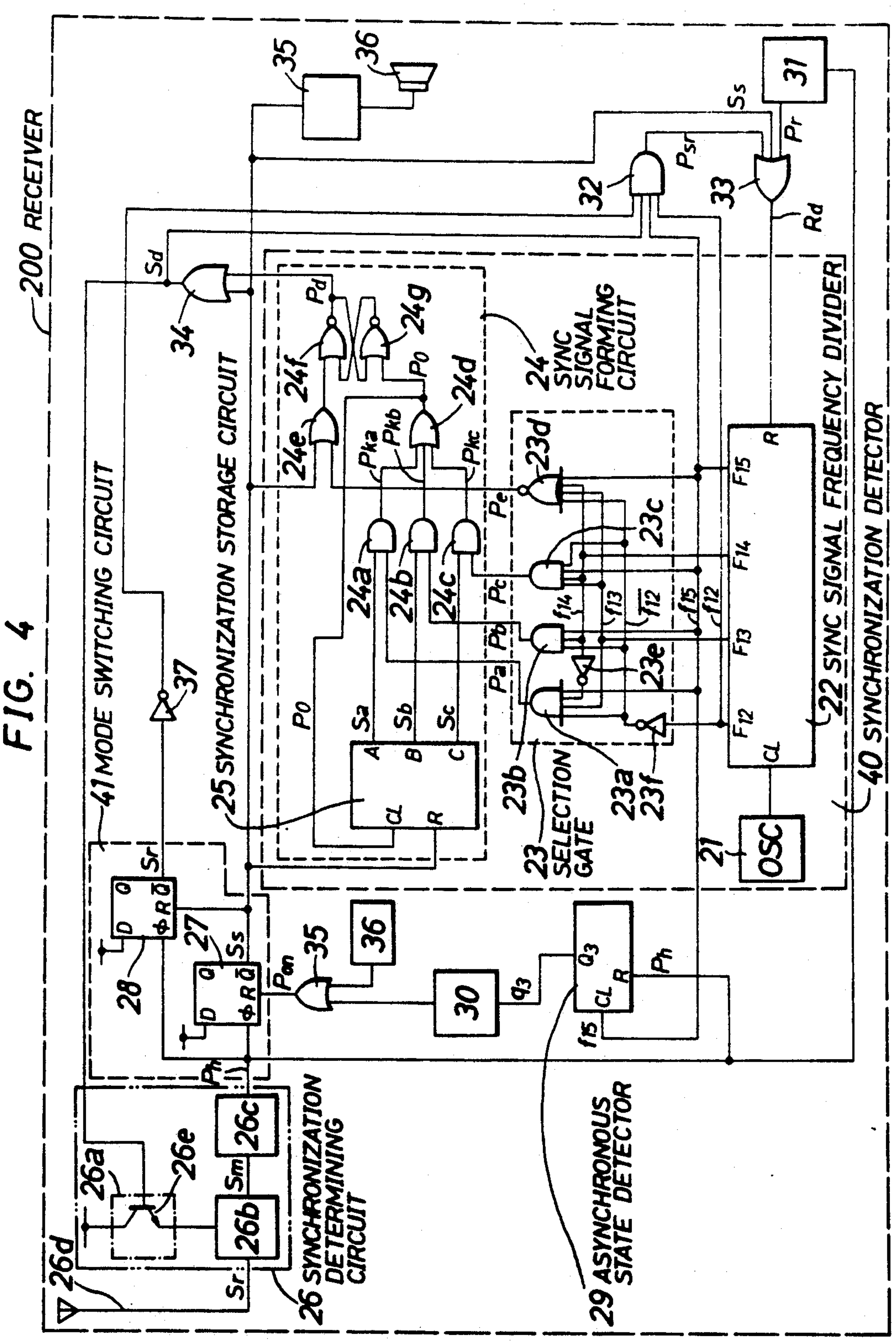
FIG. 4 is a block diagram showing a circuit arrangement of a receiver to be used in combination with the transmitter in FIG. 3, as an embodiment, of the transmitter/receiver apparatus of the present invention.

FIG. 4 shows a circuit arrangement of the receiver 200. Reference symbol 26d denotes a reception antenna; 26b, a receiving circuit; 26a, a synchronization detecting intermittent driver constituted by an NPN transistor 26e; and 26c, a waveshaping circuit. The reception antenna 26d, the receiving circuit 26b, the synchronization detecting intermittent driver 26a, and the waveshaping circuit 26c constitute a synchronization determining circuit 26.

Reference numeral 21 denotes an OSC, 22, a sync signal frequency divider; and 23, a selection gate. The selection gate 23 comprises: an AND gate 23a for setting an output signal Pa at logic "1" when frequency-divided signals f12 and f14 output from output terminals F12 and F14 of the sync signal frequency divider 22 are at logic "0" and frequency-divided signals f13 and f15 output from output terminals F13 and F15 thereof are at logic "1"; an AND gate 23b for setting an output signal Pb at logic "1" when the signal f12 is at logic "0" and the signals f14 and f15 are at logic "1"; an AND gate 23c for setting an output signal Pc at "1" when the signal f12 is at logic "0" and the signals f13, f14, and f15 are at "1"; a NOR gate 23d for setting an output signal Pe at "1" when the signal f12 is at logic "1" and the signals f13, f14, and f15 are at logic "0"; an inverter 23f for inverting the signal f12 output from the output terminal of the sync signal frequency divider 22; and an inverter 23e for inverting the signal f14 output from the output terminal F14 of the circuit 22.

Reference numeral 24 denotes a sync signal forming circuit for forming an intermittent sync signal Pd. The sync signal forming circuit 24 comprises: three AND gates 24a, 24b, and 24c for selecting one of the output signals Pa, Pb, and Pc from the selection gate 23 depending on which one of designating signals Sa, Sb, and Sc output from a synchronization storage circuit 25 (to be described later) is set at logic "1"; an OR gate 24d for forming an intermittent sync signal Po of logic "1" when one of signals Pka, Pkb, and Pkc output from the AND gates 24a, 24b, and 24c is set at logic "1"; an OR gate 24e whose output is set at logic "1" when one of a continuous mode signal Ss (to be described later) and the output signal Pe is set at logic "1"; and a NOR type latch circuit constituted by NOR gates 24f and 24g. An intermittent sync signal Pd output from the NOR gate 24f is set at logic "0" when the output of the OR gate 24e is set at logic "1", and is set at "1" when the intermittent sync signal Po is set at logic "1". The OSC 21, the sync signal frequency divider 22, the selection gate 23, and the sync signal forming circuit 24 constitute a synchronization detector 40.

Reference numeral 27 denotes a continuous mode storage circuit constituted by a D-type flip-flop with a reset input terminal R. When an initializing pulse Pon supplied to the reset terminal R is at logic "1", a continuous mode signal Ss from the $\overline{Q}$ output terminal is set at logic "1". When the D terminal receives an input "1" at the trailing edge of a determining signal Ph supplied to the $\phi$ terminal, the continuous mode signal Ss is set at logic "0".

Reference numeral 28 denotes a determination mode storage circuit constituted by a D-type flip-flop with a reset input terminal R. When a continuous mode signal Ss supplied to the reset terminal R is at logic "1", a determination mode signal Sh from the Q output terminal is set at logic "1". When the D terminal receives an input "1" at the trailing edge of a determining signal Ph supplied to the $\phi$ terminal, the determination mode signal Sh is set at logic "0". The continuous mode storage circuit 27 and the determination mode storage circuit 28 constitute a mode switching circuit 41.

Reference numeral 29 denotes an asynchronous state detector constituted by a counter which is designed such that when the trailing edge of an input signal is input to the CL terminal four times, an output signal q3 from an output terminal Q3 is set at logic "1". The counter 29 is reset when a determining signal Ph of logic "1" is supplied to its reset terminal R. Reference numeral 30 denotes a pulse generator for instantaneously generating a pulse of logic "1" upon detection of the leading edge of a signal q3 from the asynchronous state detector 29; 36, a power-on circuit which outputs a signal of logic "1" when the power source is turned on and is switched to logic "0" in a short period of time; and 35, an OR gate for outputting an initializing pulse Pon of logic "1" when either one of output signals from the pulse generator 30 and the power-on circuit 36 is at logic "1".

Reference numeral 31 denotes a pulse generator for generating a reset pulse Pr upon detection of the trailing edge of the determining signal Ph from the waveshaping circuit 26; 32, a self-reset control circuit constituted by an AND gate for outputting a self-reset control signal Psr of logic "1" when all of the frequency-divided signals f12 and f15 from the output terminals F12 and F15 of the sync signal frequency divider 22, a switch signal Sd and the determination mode signal Sh are set at logic "0"; 33, an OR gate for outputting a sync signal frequency division reset signal Rd of logic "1" when one of the continuous mode sinal Ss, the self-reset control signal Psr, and the reset pulse Pr is set at logic "1"; 34, an OR gate for outputting a switch signal Sd of logic "1" when either one of the continuous mode signal Ss and the intermittent sync signal Pd is set at logic "1"; 35, a buzzer driver for outputting an alarm signal when the continuous mode signal Ss is set at logic "1"; and 36, a buzzer for generating a missing article alarming sound.

Figure 5:
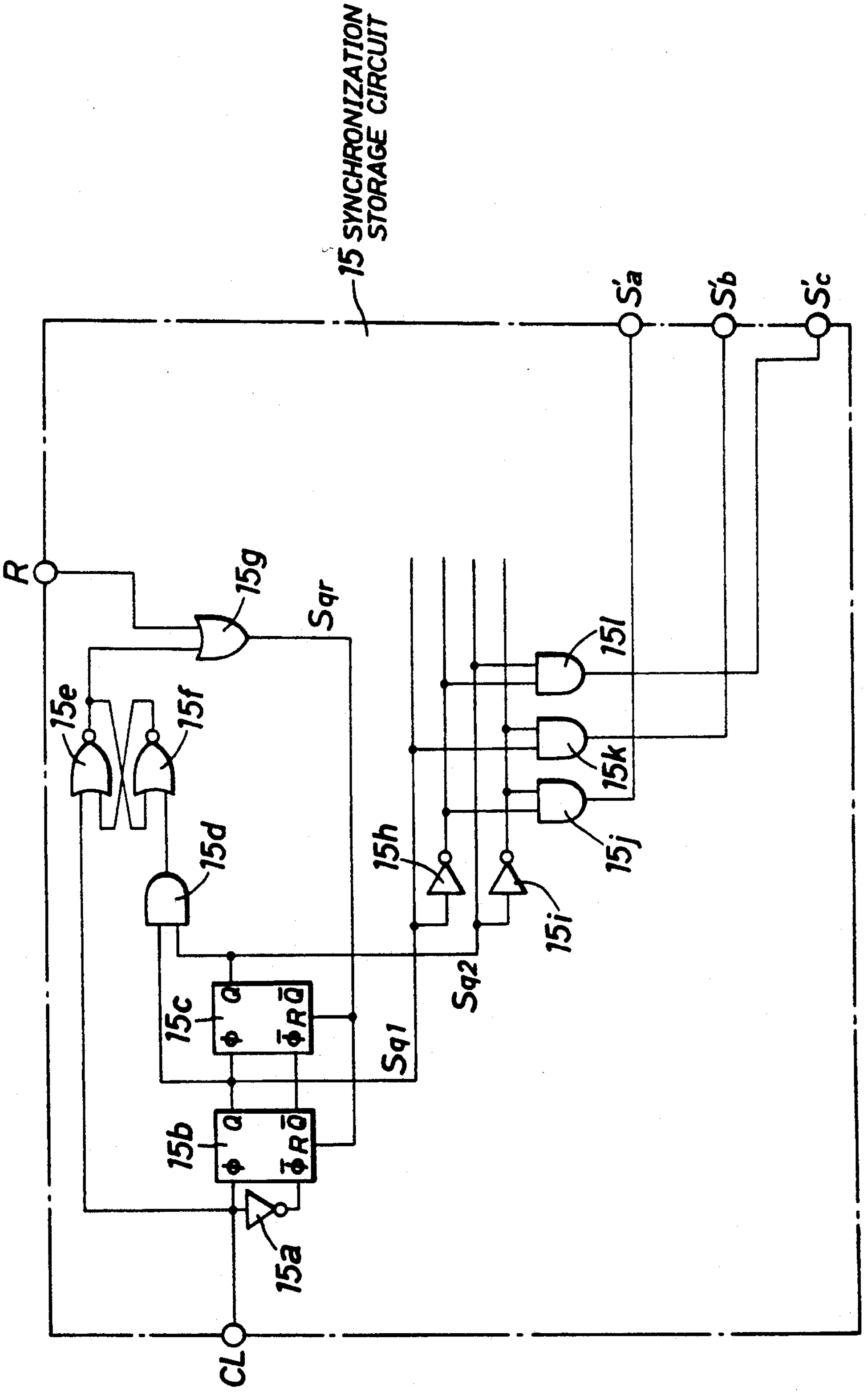
FIG. 5 is block diagram showing a circuit arrangement of a synchronization storage circuit of the transmitter in FIG. 3.

FIG. 5 is a circuit diagram showing a detailed arrangement of the synchronization storage circuit 15 in FIG. 3. A synchronization storage circuit 25 in FIG. 4 has the same arrangement as that of the circuit 15. Reference symbol 15*a* denotes an inverter for inverting an input signal CL; and 15*b* and 15*c*, flip-flops (to be referred to as FFs hereinafter) with reset input terminals R. Each of the FFs 15*b* and 15*c* performs a frequency dividing operation when the trailing edge of an input signal is input to the $\phi$ input terminal, and outputs a frequency-divided signal corresponding to one operation from the Q terminal. The FFs 15*b* and 15*c* form frequency-divided signals Sq1 and Sq2 at the trailing edge of the input signal CL. Reference symbol 15*d* denotes an AND gate for outputting a signal of logic "1" when both the frequency-divided signals Sq1 and Sq2 are set at logic "1".

Reference symbols 15*e* and 15*f* denote NOR gates constituting a NOR type latch circuit. The output of the NOR gate 15*e* is set at logic "0" when the input signal CL is changed from logic "0" to logic "1". When the output of the AND gate 15*d* is changed from logic "0" to logic "1", the output of the NOR gate 15*e* is set at logic "1".

Reference symbol 15*g* denotes an OR gate. When an external input signal R or an output from the NOR gate 15*e* is set at logic "1", a reset signal Sqr as an output signal from the OR gate 15*g* is changed to logic "1", thus resetting the FFs 15*b* and 15*c*.

Reference symbol 15*h* denotes an inverter for inverting the frequency-divided signal Sq1 from the FF 15*b*; and 15*i*, an inverter for inverting the frequency-divided signal Sq2 from the FF 15*c*.

Reference symbols 15*j*, 15*k*, and 15*l* denote AND gates. The AND gate 15*j* outputs a signal Sa of logic "1" only when both the frequency-divided signals Sq1 and Sq2 from the FFs 15*b* and 15*c* are at logic "0". The AND gate 15*k* outputs a signal Sb of logic "1" only when the frequency-divided signals Sq1 and Sq2 from the FFs 15*b* and 15*c* are respectively at logic "1" and logic "0". The AND gate 15*l* outputs a signal Sc of logic "1" only when the frequency-divided signals Sq1 and Sq2 from the FFs 15*b* and 15*c* are respectively at logic "0" and logic "1".

A circuit operation of the transmitter 100 in FIG. 3 will be described below in accordance with a timing chart in FIG. 6.

Figure 6:
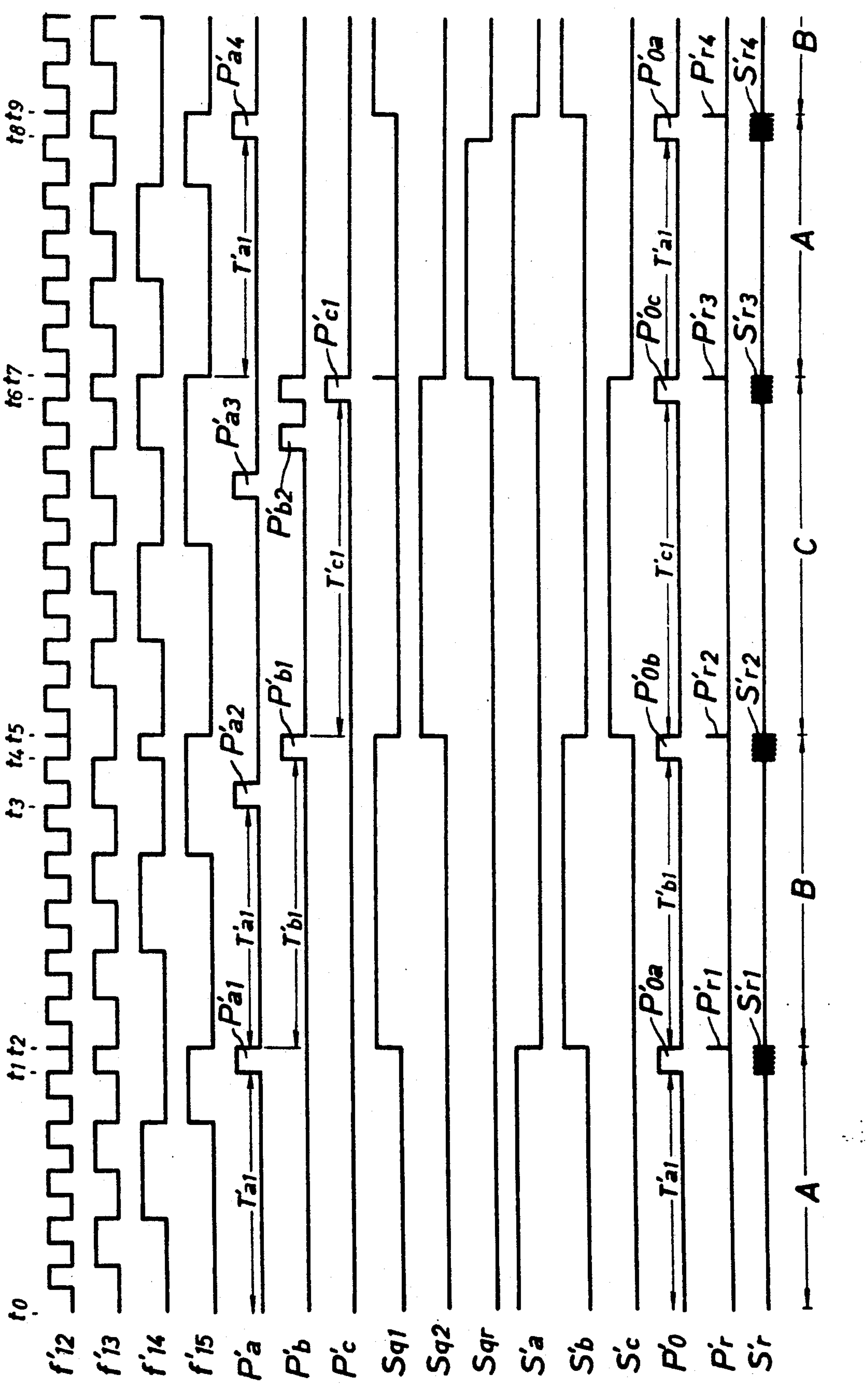
FIG. 6 is a timing chart for explaining an operation of the transmitter.

Upon reception of an oscillation output from the OSC 11, the sync signal frequency divider 12 outputs the frequency-divided signals f'12, f'13, f'14, and f'15 from a timing t0 when the circuit 12 is reset by the reset pulse P'r (as will be described later), as shown in FIG. 6. As a result, the AND gate 13*a* of the selection gate 13 outputs the output pulse P'a1 of logic "1" at a timing t1 when the signals f'13 and f'15 are set at logic "1" and the signals f'12 and f'14 are set at logic "0" after an interval T'a1 from the reset timing t0.

If the synchronization storage state of the synchronization storage circuit 15 immediately after the cancellation of the reset state is kept at this time, the frequency-divided signals Sq1 and Sq2 in FIG. 5 are at logic "0", and only the output signal S'a from the circuit 15 in FIG. 3 is at logic "1". This synchronization storage state is represented by "A".

Since the designating signal S'a is set at logic "1" and the pulse P'a is set at logic "1" as P'a1 at the timing t1, the output pulse P'ka from the AND gate 14*a* of the intermittent signal forming circuit 14 is changed to logic "1", and the intermittent signal P'o1 from the OR gate 14*d* is changed to logic "1". In the intermittent modulator 17, when the intermittent signal P'o1 is set at logic "1", the NPN transistor 17*e* constituting the intermittent driver 17*a* is turned on, and a power source voltage is applied to the transmitting circuit 17*d* so as to start a high-frequency carrier oscillating operation. The generated carrier is then modulated by the modulating signal S'm supplied from the output terminal F3 of the sync signal frequency divider 12, and is transmitted, as an intermittent radio signal S'r1, from the transmission antenna 17*c*.

When the frequency-divided signal f'12 from the sync signal frequency divider 12 is changed to logic "1" at a timing t2 in FIG. 6, the output pulse P'a1 from the AND gate 13*a* of the selection gate 13 is changed to logic "1". As a result, the output pulse P'ka from the AND gate 14*a* is changed to logic "0". Since the output signals S'b and S'c from the synchronization storage circuit 15 are at logic "0", the output pulses P'kb and P'kc from the AND gates 14*b* and 14*c* are at logic "0". Therefore, the intermittent signal P'o1 output from the OR gate 14*d* is changed to logic "0".

Consequently, the NPN transistor 17*d* constituting the intermittent driver 17*a* is turned off, and power source supply to the transmitting circuit 17*b* is stopped. As a result, the transmitting circuit 17*b* stops oscillation of the carrier signal, and the transmission of the radio signal S'r1 in FIG. 6 is stopped. When the intermittent signal P'o1 is changed to logic "0", the pulse generator 16 outputs the reset pulse P'r1 so as to reset the sync signal frequency divider 12.

When the intermittent signal P'o1 is changed to logic "0", the frequency-divided signal Sq1 output from the FF 15*b* in FIG. 5 is set at logic "1", as shown in FIG. 6. As a result, the output signal S'a from the AND gate 15*j* is changed to logic "0", and the designating signal S'b output from the AND gate 15*k* is changed to logic "1". At this time, the output signal S'c from the AND gate 15*l* is at logic "0". This state is a synchronization storage state "B".

The sync signal frequency divider 12 is instantaneously reset by the reset pulse P'r1 at the timing t2, and resumes a frequency dividing operation. Similar to the above-described operation, the output pulse P'a2 from the AND gate 13*a* is changed to logic "1" at a timing t3 after an interval T'a1 from the timing t2. As described above, however, since the synchronization storage state "B" is set at this time, and only the output signal S'b from the synchronization storage circuit 15 is at logic "1", the output signal P'ka from the AND gate 14*a* is kept at logic "0".

The frequency dividing operation of the sync signal frequency divider 12 is still continued. At a timing t4, the frequency-divided signal f'12 is set at logic "0"; the frequency-divided signals f'14 and f'15, at logic "1"; and the output pulse P'b1 from the AND gate 13*b*, at logic "1". Since the designating signal S'b is at logic "1" at this time, the output pulse P'kb from the AND gate 14*b* is changed to logic "1", and an intermittent signal P'o2 output from the OR gate 14*d* is changed to logic "1". The intermittent modulator 17 is set in an operative state, and supplies a radio signal S'r2. When the frequency-divided signal f'12 is changed to logic "1" at a timing t5, the output pulse P'b1 from the AND gate 13*b* is changed to logic "0". As a result, the OR gate 14*d* sets the intermittent signal P'o2 at logic "0" through the AND gate 14*b* so as to stop the operation of the intermittent modulator 17 and to stop supply of the radio signal S'r2.

Upon the change of the intermittent signal P'o2 to logic "0", the pulse generator 16 instantaneously sets the reset pulse P'r2 at logic "1" so as to reset the sync signal frequency divider 12. When the intermittent signal P'o2 is set at logic "0", the FFs 15*b* and 15*c* perform frequency dividing operations, and the frequency-divided signals Sq1 and Sq2 are respectively changed to logic "0" and logic "1". Then, the designating signal S'b from the AND gate 15*k* is changed to logic "0", and the designating signal S'c from the AND gate 15*l* is changed to logic "1". This synchronization storage state is represented by "C".

The sync signal frequency divider 12 which was instantaneously reset at the timing t5 in FIG. 6 resumes the frequency dividing operation. Similar to the above-described operation, pulses P'a3 and P'b2 are set at logic "1" between the timing t5 and a timing t6. However, since the designating signals S'a and S'b from the synchronization storage circuit 15 are at logic "0", the intermittent signal P'o output from the OR gate 14*d* is at logic "0".

At the timing t6 after an interval Tc1 from the timing t5, the frequency-divided signal f'12 output from the sync signal frequency divider 12 is set at logic "0", and the frequency-divided signals f'13, f'14, and f'15 are set at logic "1". As a result, an output pulse P'c1 from the AND gate 13*c* is changed to logic "1". At this time, since the designating signal S'c from the synchronization storage circuit 15 is at logic "1", the output pulse P'kc from the AND gate 14*c* is changed to logic "1", and an intermittent signal P'o3 is changed to logic "1" through the OR gate 14*d*. When the intermittent signal P'o3 is set at logic "1", similar to the intermittent signals P'o1 and P'o2, the intermittent modulator 17 is operated to output a radio signal S'r3.

When the frequency-divided signal f'12 is set at logic "1" at a timing t7, the output pulse P'c1 from the AND gate 13*c* is set at logic "0", and hence the intermittent signal P'o3 is changed to logic "0" through the AND gate 14*c* and the OR gate 14*d*. As a result, the operation of the intermittent modulator 17 is stopped, and the transmission of the radio signal S'r3 is stopped.

Since the intermittent signal P'o3 is changed to logic "0", the pulse generator 16 instantaneously outputs a reset signal P'r3 of logic "1" so as to instantaneously reset the sync signal frequency divider 12.

In addition, when the intermittent signal P'o3 is changed to logic "0", the FFs 15*b* and 15*c* of the synchronization storage circuit 15 in FIG. 5 perform frequency dividing operations, and hence the frequency-divided signals Sq1 and Sq2 respectively output from the FFs 15*b* and 15*c* are set at logic "1". Upon the change of the signals Sq1 and Sq2 to logic "1", the AND gate 15*d* is changed to logic "1" so as to set an output from the NOR gate 15*e* as an output from the NOR type latch circuit constituted by the NOR gates 15*e* and 15*f* at logic "1". Upon this operation, the reset signal Sqr output from the NOR gate 15*g* is set at logic "1". Consequently, the FFs 15*b* and 15*c* are reset, and the frequency-divided signals Sq1 and Sq2 are changed to logic "0". When the signals Sq1 and Sq2 are set at logic "0", the signal S'a output from the AND gate 15*j* is set at logic "1", the output signals S'b and S'c from the AND gates 15*k* and 15*l* are set at logic "0". That is, the synchronization state "A", which is obtained at timing t0, is restored at a timing t7 in FIG. 6.

The above-described operation corresponds to one transmission cycle. When this one cycle is completed, the next cycle is started. In the next cycle, similar to the interval between the timings t0 and t2, the state "A" is set between the timing t7 and a timing t9, in which a radio signal S'r4 is transmitted after the interval T'a1. From the timing t9, the state "B" is set, in which a radio signal S'r5 is transmitted after the interval T'b1, similar to the interval between the timings t2 and t5. Subsequently, the states "A", "B", and "C" are repeated each cycle.

The transmitter 100 of the present invention repeatedly sets the synchronization storage states "A", "B", "C", "A", "B", "C", "A", . . . in the above-described manner so as to cyclically change the transmission intervals of the radio signal S'r as T'a1, T'b1, T'c1, T'a1, . . . .

The receiver 200 in FIG. 4 will be described below with reference to FIGS. 7 to 9.

Figure 7:
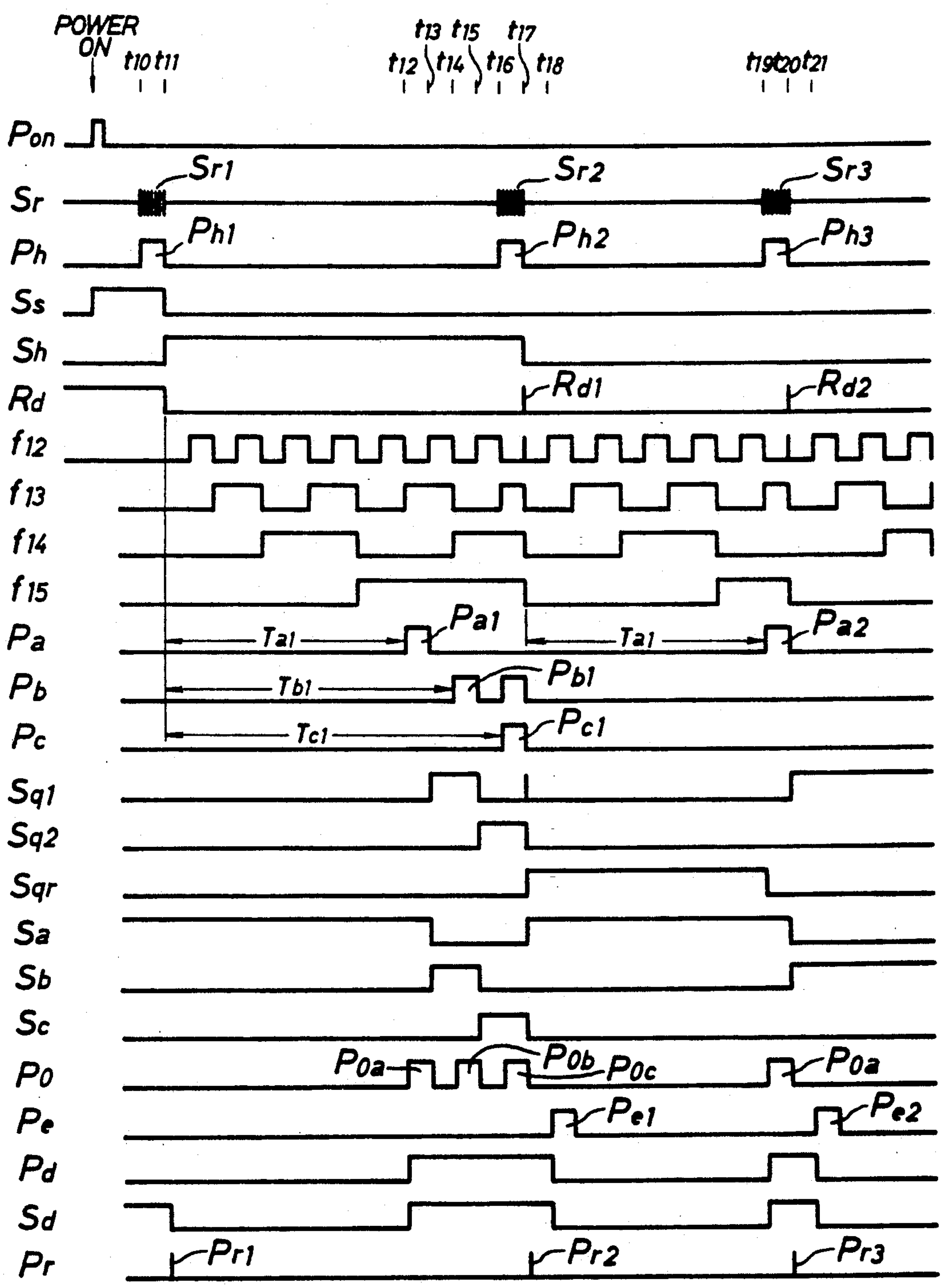
FIG. 7 is a timing chart for explaining an operation of the receiver.

FIG. 7 is a timing chart for explaining an operation in which the receiver 200 is switched from a continuous operation mode to an intermittent operation mode, and a synchronous timing is selected.

When the power source of the receiver 200 is turned on, the power-on circuit 36 in FIG. 4 outputs a signal of logic "1", and the initializing pulse Pon of logic "1" is output from the OR gate 35. As a result, the continuous mode storage circuit 27 is reset, and the continuous mode signal Ss is set at logic "1". Since the output of the power-on circuit 36 is set at logic "0" in a short period of time, the initializing pulse Pon from the OR gate 35 is set at logic "0". When the reset state of the continuous mode storage circuit 27 is canceled, it waits for the input of the trailing edge of the determining signal Ph. Since the continuous mode signal Ss is at logic "1" at this time, the switch signal Sd output from the OR gate 34 is set at logic "1". Hence, the NPN transistor 26*e* constituting the synchronization detecting intermittent driver 26*a* is kept ON to continuously operate the receiving circuit 26*b*. In addition, since the continuous mode signal Ss is at logic "1", the sync signal forming circuit 24 is reset to output the intermittent sync signal Pd of logic "0".

Since the continuous mode signal Ss is at logic "1", the sync signal frequency division reset signal Rd is set at logic "1". Consequently, the sync signal frequency divider 22 is reset, and no frequency dividing operation is performed. Therefore, the selection gate 23 and the asynchronous state detector 29 are not operated.

Furthermore, since the continuous mode signal Ss is at logic "1", the determination mode storage circuit 28 is also reset, and the determination mode signal Sh is at logic "1".

Moreover, since the continuous mode signal Ss is at logic "1", the synchronization storage circuit 25 is reset.

In this state, only the signal Sa of the designating signals is at logic "1", and the designation signals Sb and Sc are at logic "0". That is, the synchronization storage state "A" is set in the same manner as in the synchronization storage circuit 15 of the transmitter 100.

The above description is about the continuous mode corresponding to the standby state of the receiver 200. In this state, the continuous mode signal Ss, as an output signal from the continuous mode storage circuit 27, is at logic "1", and the sync signal forming circuit 24 outputs the intermittent sync signal Pd of logic "0". The switch signal Sd is at logic "1", and the receiving circuit 26*b* is continuously operated. In addition, the sync signal frequency divider 22 is in a reset state, and hence no frequency dividing operation is performed. Therefore, the asynchronous state detector 29 does not perform a counting operation. Since the continuous mode signal Ss is at logic "1", the buzzer driver 35 causes the buzzer 36 to output a buzzer sound so as to inform a user that the power source of the receiver is turned on.

In this state, when the receiving circuit 26*b* receives, through the reception antenna 26*d*, a first radio signal Sr1 transmitted from the receiver 100 at a timing t10 in FIG. 7, a demodulating signal Sm is generated, and a determining signal Ph1 of logic "1" is output through the waveshaping circuit 26*c*. When the determining signal Ph1 is set at logic "1", the asynchronous state detector 29 is reset, but the output signal q3 is not changed from logic "0". Therefore, since the continuous mode storage circuit 27 is not reset and kept in the previous state, the receiving circuit 26*b* is kept in the continuous operation mode.

When the duration of the radio signal Sr1 ends at a timing t11, and the determining signal Ph1 is changed from logic "1" to logic "0", the continuous mode storage circuit 27 is set at the timing of the trailing edge of the signal Ph1, and the continuous mode signal Ss as its output is set at logic "0". Therefore, the continuous mode is switched to the intermittent synchronous mode. Since the continuous mode signal Ss is set at logic "0", the switch signal Sd output from the OR gate 34 is set at logic "0". Thus, the NPN transistor 26*e* of the synchronization detecting intermittent driver 26*a* is turned off to set the receiving circuit 26*b* in an inoperative state. In addition, since the continuous mode signal Ss is set at logic "0", the sync signal frequency division reset signal Rd output from the OR gate 33 is also set at logic "0", and the reset state of the sync signal frequency divider 22 is canceled to start a frequency dividing operation. At this time, since the determining signal Ph1 is set at logic "0", the reset state of the asynchronous state detector 29 is canceled. As a result, the detector 29 waits for the trailing edge of the frequency-divided signal f15 from the sync signal frequency divider 22. Since the continuous mode signal Ss is set at logic "0" and the buzzer 36 stops outputting the buzzer sound, the user can recognize that the receiver 200 started receiving the radio signal from the transmitter 100.

An operation will be described next, in which it is checked, on the basis of the reception timing of a radio signal Sr2 which is received immediately after the radio signal Sr1, which one of the synchronization storage modes "A", "B", and "C" the radio signal Sr2 has, thus determining the subsequent synchronization storage mode.

When the sync signal frequency divider 22 starts an operation after its reset state is canceled by the trailing edge of the determining signal Ph1, the frequency-divided signals f12 and f14 output from the output terminals F12 and F14 of the divider 22 are set to logic "0" and the frequency-divided signals f13 and f15 output from the output terminals F13 and F15 thereof are set at logic "1" at a timing t12 after an interval Ta1 from the timing t11 in FIG. 7. As a result, an output signal Pa1 from the AND gate 23*a* is set at logic "1". The interval Ta1 is equal to the interval T'a1 of the timing chart of the transmitter 100 in FIG. 6. Since the output pulse Pa1 from the AND gate 23*a* is set at logic "1", and only the signal Sa of the designating signals output from the synchronization storage circuit 25 is set at logic "1"; only a pulse Pka of output pulses Pka, Pkb, and Pkc from the AND gates 24*a*, 24*b*, and 24*c* is changed to logic "1".

Consequently, an intermittent sync signal Po1 output from the OR gate 24*d* is set at logic "1". When the signal Po1 is set at logic "1", the NOR type latch circuit constituted by the NOR gates 24*f* and 24*g* of the sync signal forming circuit 24 is set, and the output signal Pd is set at logic "1". The switch signal Sd output from the OR gate 34 is also set at logic "1". When the switch signal Sd is set at logic "1", the NPN transistor 26*e* of the synchronization detecting intermittent driver 26*a* is turned on to set the receiving circuit 26*b* in an operative state.

When the frequency-divided signal f12 from the sync signal frequency divider 22 is changed to logic "1" at a timing t13 in FIG. 7, the output pulse Pa1 from the AND gate 23*a* is changed to logic "0". Therefore, the output pulse Po from the OR gate 24*d* is changed to logic "0" through the AND gate 24*a* and is supplied to the CL terminal of the synchronization storage circuit 25. Since the synchronization storage circuit 25 has the same circuit arrangement as that of the synchronization storage circuit 15 of the transmitter 100, which is shown in FIG. 5, the FF 15*b* performs a frequency dividing operation upon reception of the output pulse Po, and the frequency-divided signal Sq1 is changed to logic "1". The frequency-divided signals Sq1 and Sq2 are respectively set at logic "1" and logic "0", and the designating signals Sa and Sb from the AND gates 15*j* and 15*k* are respectively set at logic "0" and logic "1". In addition, since the NOR type latch circuit constituted by the NOR gates 24*f* and 24*g* of the sync signal forming circuit 24 is set, the output signal Pd and the switch signal Sd output from the OR gate 34 are kept at logic "1". Since the NPN transistor 26*e* of the synchronization detecting intermittent driver 26*a* is ON, the receiving circuit 26*b* is kept in the operative state.

At this time, the switch signal Sd and the frequency-divided signals f12 and f15 from the sync signal frequency divider 22 as the input conditions of the self-reset control circuit 32 are set at logic "1". However, since the determination mode signal Sh from the determination mode storage circuit 28 is set at logic "1", the output of an inverter 37 is set at logic "0". Therefore, the self-reset pulse Psr output from the self-reset control circuit 32 is kept at logic "0", and a self-reset operation is not performed.

At a timing t14 after an interval Tb1 from the timing t11 in FIG. 7, the frequency-divided signals f12 and f13 output from the output terminals F12 and F13 are set at logic "0" and the frequency-divided signals f14 and f15 output from the output terminals F14 and F15 thereof are set at logic "1", and the output signal Pb from the AND gate 23*b* constituting the selection gate 23 is set at logic "1". The interval Tb1 is equal to the interval T'b1 of the timing chart of the transmitter 100 in FIG. 6.

Since the output pulse Pb1 from the AND gate 23*b* is set at logic "1", and the designating signal Sb from the synchronization storage circuit 25 is set at logic "1", only the output pulse Pkb from the AND gate 24*b* is changed to logic "1". Therefore, an intermittent sync signal Po2 output from the OR gate 24*d* is set at logic "1". At this time, since the NOR type latch circuit constituted by the NOR gates 24*f* and 24*g* of the sync signal forming circuit 24 is set, the output signal Pd is kept at logic "1", and the switch signal Sd output from the OR gate 34 is also kept at logic "1". In this state, since the NPN transistor 26*e* of the synchronization detecting intermittent driver 26*a* is ON, the receiving circuit 26*b* is kept in the operative state. When the frequency-divided signal f12 from the sync signal frequency divider 22 is changed to logic "1" at a timing t15 in FIG. 7, the output pulse Pb1 from the AND gate 23*b* is changed to logic "0". Consequently, the output pulse Po2 from the OR gate 24*d* is changed to logic "0" through the AND gate 24*b* and is supplied to the CL terminal of the synchronization storage circuit 25. As shown in FIG. 5, when the intermittent sync signal Po is input to the CL terminal of the synchronization storage circuit 25, the FFs 15*b* and 15*c* perform frequency dividing operations, and the frequency-divided signals Sq1 and Sq2 are respectively changed to logic "0" and logic "1". As a result, the designating signals Sb and Sc from the AND gates 15*k* and 15*l* are respectively set at logic "0" and logic "1".

Since the switch signal Sd is kept at logic "1", the receiving circuit 26*b* continues the operation, and a self-reset operation is not performed, similar to the operation at the timing t13 in FIG. 7.

At a timing t16 after an interval Tc1 from the timing t11 in FIG. 7, the frequency-divided signal f12 output from the output terminal F12 of the sync signal frequency divider 22 is set at logic "0" and the frequency-divided signals f13, f14, and f15 output from the output terminals F13, F14, and F15 are set at logic "1". Therefore, the output signal Pc from the AND gate 23*c* constituting the selection gate 23 is set at logic "1". The interval Tc1 is equal to the interval T'c1 of the timing chart of the transmitter 100 in FIG. 6. Since an output pulse Pc1 from AND gate 23*c* is set at logic "1" and only the designating signal Sc from the synchronization storage circuit 25 is set at logic "1", only the output pulse Pkc from the AND gate 24*c* is changed to logic "1". As a result, an output pulse Po3 from the OR gate 24*d* is set at logic "1". Since the NOR type latch circuit constituted by the NOR gates 24*f* and 24*g* of the sync signal forming circuit 24 is set during this period, the intermittent sync signal Pd and the switch signal Sd output from the OR gate 34 are kept at logic "1". Since the NPN transistor 26*e* of the synchronization detecting intermittent driver 26*a* is ON, the receiving circuit 26*b* is kept in the operative state.

When the receiving circuit 26*b* receives the radio signal Sr2 from the transmitter 100 at the timing t16 in FIG. 7, the waveshaping circuit 26*c* changes a determining signal Ph2 to logic "1". When the determining signal Ph2 is changed to logic "1", the asynchronous state detector 29 stops the counting operation. However, the output signal q3 from the detector 29 is not changed.

The duration of the radio signal Sr2 from the transmitter 100 ends at a timing t17 in FIG. 7, and the determining signal Ph2 is charged from logic "1" to logic "0". Therefore, the pulse generator 31 generates a reset pulse Pr2 shown in FIG. 7 so as to instantaneously reset the sync signal frequency divider 22 through the OR gate 33. With this operation, all the frequency-divided signals are reset, and a frequency dividing operation is resumed. At the moment of the reset operation, therefore, all the frequency-divided signals f12, f13, f14, and f15 output from the sync signal frequency divider 22 are set at logic "0", the output signal Pc1 from the AND gate 23*c* is changed from logic "1" from logic "0", and the output pulse Po3 from the OR gate 24*d* is set at logic "0" through the AND gate 24*c*. Since the output pulse Po3 from the OR gate 24*d* is changed to logic "0", the FFs 15*b* and 15*c* (shown in FIG. 5) of the synchronization storage circuit 25 perform frequency dividing operations, and the frequency-divided signals Sq1 and Sq2 are set at logic "1". Upon reception of the frequency-divided signals of logic "1", the AND gate 15*d* outputs a signal of logic "1" so as to operate the NOR type latch circuit constituted by the NOR gates 15*e* and 15*f*. As a result, an output from the NOR gate 15*e*, as an output from the latch circuit, is changed to logic "1". Upon reception of this signal, the reset signal Sqr from the OR gate 15*g* is set at logic "1". The FFs 15*b* and 15*c* are reset, and the frequency-divided signals are changed to logic "0".

When the frequency-divided signals Sq1 an Sq2 are restored to logic "0", the designating signal Sa from the AND gate 15*j* is changed to logic "1", and the designating signal Sc from the AND gate 15*l* is changed to logic "0". The state in which the synchronization storage circuit 25 sets only the designating signal Sa at logic "1" in the above-described manner is equivalent to the synchronization storage state "A".

In addition, when the determining signal Ph2 in FIG. 7 is changed from logic "1" to logic "0", the continuous mode storage circuit 27 reads in logic "1" at the D terminal. However, the continuous mode signal Ss from the $\overline{Q}$ output terminal is kept at logic "0".

Furthermore, when the determination mode storage circuit 28 reads in logic "1" at the D terminal, the determination mode singal Sh from the $\overline{Q}$ output terminal is changed to logic "0". The inverter 37 outputs a signal of logic "1" and allows a subsequent self-reset operation.

At this time, the reset state of the asynchronous state detector 29 is canceled when the determining signal Ph2 is set at logic "0". The detector 29 performs a counting operation when it receives the frequency-divided signal f15, which was changed from logic "1" to logic "0" when the sync signal frequency divider 22 is reset, through the CL terminal. An output signal from the inverter 23*f* is then set at logic "0" at a timing t18 in FIG. 7 when the frequency-divided signal f12 from the divider 22 is changed from logic "0" to logic "1". Since the frequency-divided signals f13, f14, and f15 are at logic "0" at this time, all the input signals to the NOR gate 23*d* are set at logic "0" and an output signal Pe1 therefrom is set at logic "1". When an output signal from the OR gate 24*e* of the sync signal forming circuit 24 is changed from logic "0" to logic "1", the NOR latch circuit constituted by the NOR gates 24*f* and 24*g* is reset, and the sync pulse Pd is changed from logic "1" to logic "0". Therefore, the switch signal Sd from the OR gate 34 is also changed from logic "1" to logic "0". With this operation, the NPN transistor 26*e* of the synchronization detecting intermittent driver 26*a* is turned off, and the receiving circuit 26*b* stops the receiving operation, thereby completing the synchronization detecting operation.

The synchronization detecting operation for shifting the receiver 200 from the continuous operation mode to the synchronous intermittent operation mode has been described above. In this operation, as described above, when the receiving circuit 26*b* which is continuously operated receives the radio signal Sr1 at the timing t11 in FIG. 7, it starts the intermittent operation. However, it is not known at first that at which one of the timings of the synchronization storage states "A", "B", and "C" the radio signal Sr2 is received. Therefore, in order to receive the radio signal Sr2 in any one of the states "A", "B", and "C", the switch signal Sd is set at logic "1" in each synchronization storage state, and a synchronization storage state is determined from the timing of the received radio signal Sr2, thus determining the synchronization storage state of a next radio signal Sr3.

That is, in the case shown in FIG. 7, the synchronization storage state set from the timing of the radio signal Sr1 to that of the radio signal Sr2 is the state "C", and the synchronization storage circuit 25 stores that the next radio signal Sr3 is received at the cycle of the state "A".

A synchronous intermittent operation will be described below. At a timing t19 after an interval Tab from the timing t17 in FIG. 7, the frequency-divided signals f13 and f15 from the divider 22 are set at logic "1", and the frequency-divided signals f12 and f14 therefrom are set at logic "0". Then, the output pulse Pa2 from the AND gate 23*a* is changed to logic "1". In this case, since the designating signal Sa from the synchronization storage circuit 25 is set at logic "1" by the synchronous detecting operation, the output pulse Pka from the AND gate 24*a* is changed to logic "1", and an output pulse Po4 from the OR gate 24*d* is changed to logic "1". As a result, the sync signal Pd is set at logic "1", and the switch signal Sd output from the OR gate 34 is set at logic "1". Therefore, the NPN transistor 26*e* of the synchronization detecting intermittent driver 26*a* is turned on to set the receiving circuit 26*b* in an operative state.

When the output pulse Po4 from the OR gate 24*d* is changed to logic "1", a signal of logic "1" is supplied to the CL terminal of the synchronization storage circuit 25. Since the signal of logic "1" is input to the CL terminal of the synchronization storage circuit shown in FIG. 5, the NOR type latch circuit constituted by the NOR gates 15*e* and 15*f* is reset, and the output of the NOR gate 15*e* is set at logic "0". Since the continuous mode signal Ss is at logic "0", the output signal Sqr from the OR gate 15*g* is changed to logic "0", and the reset states of the FFs 15*b* and 15*c* are canceled.

As described above, since the interval Ta1 (shown in FIG. 7) in the receiver 200 is equal to the interval T'a1 (shown in FIG. 6) in the transmitter 100, the receiving circuit 26*b* of the receiver 200 is started at the timing t19, and at the same time the radio signal Sr3 from the transmitter 100 is received by the antenna 26*d*. Therefore, the radio signal Sr3 is demodulated by the receiving circuit 26*b*, and a determining signal Ph3 from the waveshaping circuit 26*c* is set at logic "1". When the signal Phe is set at logic "1", the asynchronous state detector 29 is set in a reset state so as to stop the counting operation. Therefore, the output signal q3 from the output terminal Q3 of the detector 29 is kept at logic "0". Even when the determining signal Ph3 is changed from logic "0" to logic "1", since the continuous mode storage circuit 27, the determination mode storage circuit 28, and the pulse generator 31 are disabled, their states are not changed.

The duration of the radio signal Sr3 ends at a timing t20 in FIG. 7, and the determining signal Ph3 is changed from logic "1" to logic "0". Then, the pulse generator 31 generates a reset pulse Pr3 so as to instantaneously reset the sync signal frequency divider 22 through the OR gate 33. With this operation, all the frequency-divided signals are reset, and an operation is started again. In this state, all the frequency-divided signals f12, f13, f14, and f15 output from the sync signal frequency divider 22 are reset to logic "0", and the output signal from the AND gate 23*a* is changed from logic "1" to logic "0". The output signal Po4 from the OR gate 24*d* is changed from logic "1" to logic "0" and is supplied to the CL terminal of the synchronization storage circuit 25. As a result, the FF 15*b* in FIG. 5 performs a frequency dividing operation, and hence the frequency-divided signal Sq1 therefrom is changed to logic "1". Since the frequency-divided signal Sq2 from the FF 15*c* is at logic "0", the designating signal Sa from the AND gate 15*j* is changed from logic "1" to logic "0", and the designating signal Sb from the AND gate 15*k* is changed from logic "0" to logic "1". That is, the synchronization storage state "B" is set.

When the determining signal Ph3 is changed from logic "1" to logic "0", the continuous mode storage circuit 27 reads in logic "1" at the D terminal. However, the continuous mode signal Ss at the $\overline{Q}$ output terminal is not changed and kept at logic "0". Similarly, when the signal Ph3 is changed from logic "1" to logic "0", the determination mode storage circuit 28 reads in logic "1" at the D terminal. However, the determination mode signal Sh at the $\overline{Q}$ output terminal is not changed and kept at logic "0". At this time, since the determining signal Ph3 is set at logic "0", the reset state of the asynchronous state detector 29 is canceled, and receives the frequency-divided signal f15 which was changed from logic "1" to logic "0" when the sync signal frequency divider 22 is reset, thus performing a counting operation.

An output signal from the inverter 23*f* is set at logic "0" at a timing t21 when the frequency-divided signal f12 from the sync signal frequency divider 22 is changed from logic "0" to logic "1". Since the frequency-divided signals f13, f14, and f15 are at logic "0" at this time, all the input signals to the NOR gate 23*d* are set at logic "0", and its output signal Pe2 is set at logic "1". When an output signal from the OR gate 24*e* of the sync signal forming circuit 24 is changed from logic "0" to logic "1", the NOR type latch circuit constituted by the NOR gates 24*f* and 24*g* is reset, and the intermittent sync signal Pd is changed from logic "1" to logic "0". As a result, the switch signal Sd output from the OR gate 34 is also changed from logic "1" to logic "0". With this operation, the NPN transistor 26*e* of the synchronization detecting intermittent driver 26*a* is turned off, and hence the receiving circuit 26*b* stops the receiving operation.

Every time the receiving circuit 26*b* is set in an operative state by the switch signal Sd in the above-described manner, the radio signal Sr from the transmitter 100 is received, and the sync signal frequency divider 22 is reset by the determining signal Ph. Therefore, the intermittent mode is repeated by this synchronous detecting operation. In this embodiment, the NOR type latch circuit constituted by the NOR gates 24*f* and 24*g* is designed to output the intermittent sync singal Pd obtained by increasing the pulse width of the intermittent sync signal Po.

An intermittent operation of the receiver will be described below with reference to FIG. 8. In FIG. 8, timings t16, t17, t18, t19, t20, and t21 are equivalent to those denoted by the same reference symbols in FIG. 7, and signals such as signals Sr2 and Sr3 correspond to those denoted by the same reference symbols in FIG. 7.

As described above, since the output signal Sa from the synchronization storage circuit 25 is kept at logic "1" between the trailing edges of the radio signals Sr2 and Sr3, the synchronization storage state "A" is set during this cycle. In addition, as described above, since the designating signal Sb from the circuit 25 is changed to logic "1" at the timing t20 corresponding to the trailing edge of the radio signal Sr3, the synchronization storage state is changed from the state "A" to the state "B".

Figure 8:
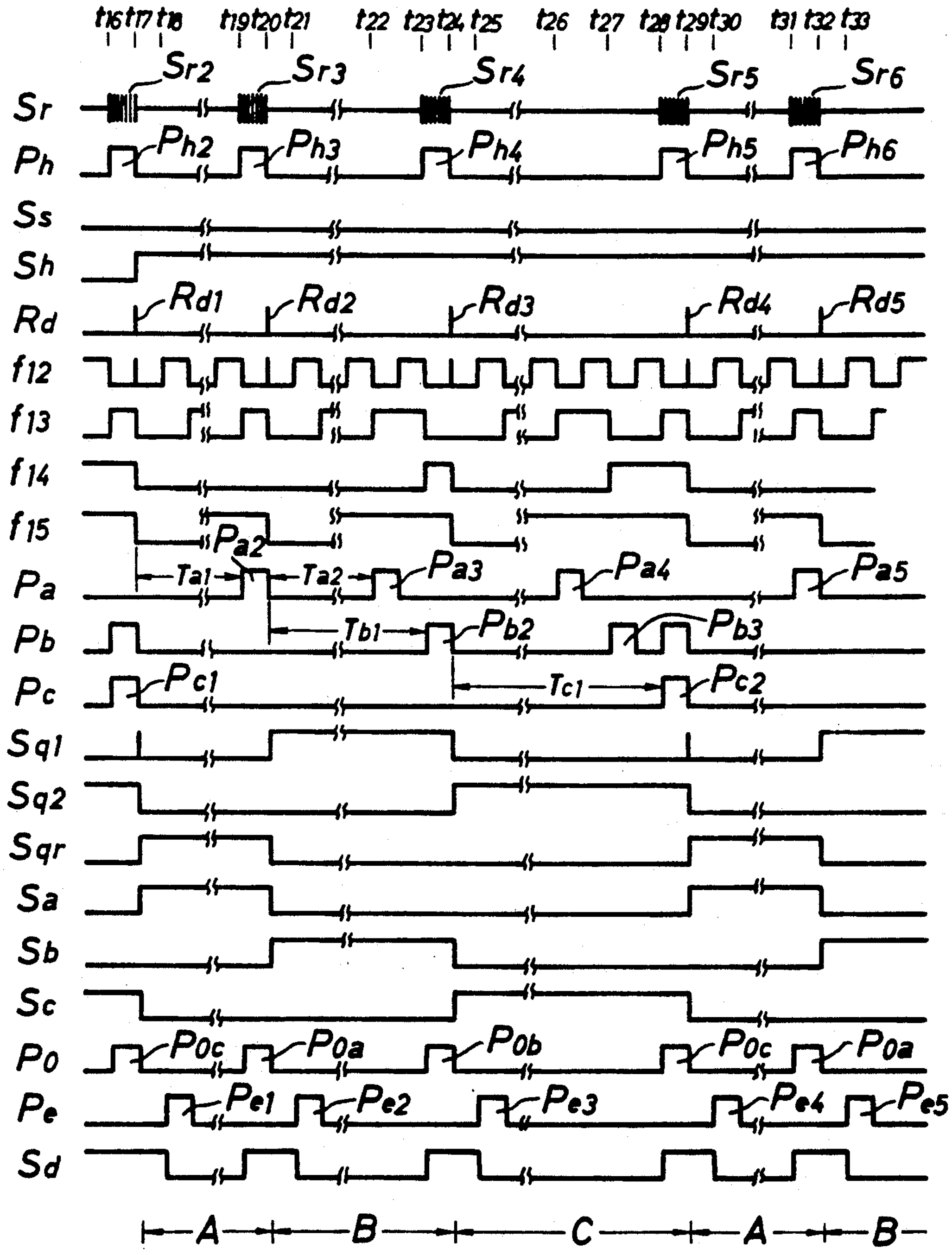
FIG. 8 is a timing chart for explaining a synchronous intermittent operation of the receiver.

Since the frequency-divided signals f12 and f14, and the frequency-divided signals f13 and f15 from the synchronization storage circuit 25 are respectively set at logic "0" and logic "1" at a timing t22 after an interval Ta2 from the timing t20 corresponding to the trailing edge of the radio signal Sr3 in FIG. 8, the output pulse Pa3 from the AND gate 23*a* is changed to logic "1". However, since the designating signal Sa from the synchronization storage circuit 25 is set at logic "0", the output pulse Pka from the AND gate 24*a* is not changed and kept at logic "0".

Subsequently, the frequency-divided signals f14 and f15, and the frequency-divided signals f12 and f13 from the sync signal frequency divider 22 are respectively set at logic "1" and logic "0" at a timing t23 after an interval Tb1 from the timing t20 corresponding to the trailing edge of the Sr3 in FIG. 8. As a result, the output pulse from the AND gate 23*c* is changed to logic "1". Since the designating signal Sb from the synchronization storage circuit 25 is at logic "1" at this time, the output pulse Pkb from the AND gate 24*b* is set at logic "1", and an output pulse Po5 from the OR gate 24*d* is changed to logic "1". Therefore, the intermittent sync signal Pd output from the NOR gate 24*f* and the switch signal Sd are set at logic "1", and the receiving circuit 26*b* is set in an operative state through the synchronization detecting intermittent driver 26*a*.

Since the interval Tb1 from the timing t20 corresponding to the trailing edge of the radio signal Sr2 to the timing t23 in FIG. 8 is equal to the interval Tb1 in the transmitter 100 in FIG. 6, the transmitter 100 starts transmitting a radio signal Sr4 at the timing t23. As described above, since the receiving circuit 26*b* starts the operation at the timing t23, the radio signal Sr4 received by the antenna 26*d* is demodulated by the receiving circuit 26*b*, and a determining signal Ph4 output from the waveshaping circuit 26*c* is set at logic "1".

The duration of the radio signal Sr4 ends at a timing t24 in FIG. 8, and the determining signal Ph4 is changed from logic "1" to logic "0". As a result, the pulse generator 31 generates a reset pulse Pr so as to instantaneously reset the sync signal frequency divider 22 through the OR gate 33. With this operation, all the frequency-divided signals are reset, and an operation is started again. In this state, all the frequency-divided signals f12, f13, f14, and f15 output from the sync signal frequency divider 22 are reset to logic "0", and the output signal Pb2 from the AND gate 23*b* is changed from logic "1" to logic "0". Therefore, the output pulse Po5 from the OR gate 24*d* is changed to logic "0" through the AND gate 24*b*.

As described above, when the synchronization storage circuit 25 receives the output pulse Po5, the designating signal Sb is changed from logic "1" to logic "0", and the designating signal Sc is changed from logic "0" to logic "1". Therefore, the synchronization state is changed from the state "B" to the state "C".

In addition, the frequency-divided signal f12 output from the sync signal frequency divider 22, which was reset at the timing t24 and is restarted, is changed to logic "1" at a timing t25, and an output signal from the inverter 23*f* is set at logic "0". At this time, since the frequency-divided signals f13, f14, and f15 are at logic "0", all the input signals to the NOR gate 23*d* are set at logic "0" and an output signal Pe3 therefrom is set at logic "1". When an output signal from the OR gate 24*e* of the sync signal forming circuit 24 is changed from logic "0" to logic "1", the sync pulse Pd is changed from logic "1" to logic "0". The switch signal Sd output from the OR gate 34 is also changed from logic "1" to logic "0". As a result, the receiving circuit 26*b* stops the receiving operation through the synchronization detecting intermittent driver 26*a*.

At a timing t26 in FIG. 8, since the frequency-divided signals f12 and f14, and the frequency-divided signals f13 and f15 from the synchronization storage circuit 25 are respectively set at logic "0" and logic "1", the output pulse Pa4 from the AND gate 23*a* is changed to logic "1". However, since the designating signal Sa from the synchronization storage circuit 25 is at logic "0", the output pulse Pka from the AND gate 24*a* is not changed and kept at logic "0".

At a timing t27 in FIG. 8, since the frequency-divided signals f12 and f13, and the frequency-divided signals f14 and f15 from the synchronization storage circuit 25 are respectively set at logic "0" and logic "1", an output pulse Pb3 from the AND gate 23*b* is changed to logic "1". However, since the designating signal Sb from the synchronization storage circuit 25 is at logic "0", the output pulse Pkb from the AND gate 24*b* is not changed and kept at logic "0".

At a timing t28 after an interval Tc1 from the timing t24 corresponding to the trailing edge of the radio signal Sr4 in FIG. 8, the frequency-divided signal f12 from the sync signal frequency divider 22 is set at logic "0" and the frequency-divided signals f13, f14, and f15 therefrom are set at logic "1". Therefore, an output pulse Pc2 from the AND gate 23*c* is changed to logic "1". At this timing, since the designating signal Sc from the synchronization storage circuit 25 is at logic "1", the output pulse Pkc from the AND gate 24*c* is set at logic "1". As a result, an output pulse Po6 from the OR gate 24*d* is changed to logic "1". With this operation, the intermittent sync signal Pd output from the NOR gate 24*f* and the switch signal Sd are set at logic "1" so as to set the receiving circuit 26*b* in an operative state through the synchronization detecting intermittent driver 26*a*.

Since the interval Tc1 from the timing t24 corresponding to the trailing edge of the radio singal Sr4 to the timing t28 in FIG. 8 is equal to the interval T'c1 in the transmitter 100 in FIG. 6, the transmitter 100 starts transmitting a radio signal Sr5 at the timing t28. As described above, since the receiving circuit 26*b* starts the operation at the timing t28, the radio signal Sr5 received by the antenna 26*d* is demodulated by the receiving circuit 26*b*, and the waveshaping circuit 26*c* sets the determining signal Ph5 at logic "1".

The duration of the radio signal Sr5 ends at a timing t29 in FIG. 8, and the determining signal Ph5 is changed from logic "1" to logic "0". As a result, the pulse generator 31 generates a reset pulse Pr so as to instantaneously reset the sync signal frequency divider 22 through the OR gate 33, and subsequently restarts it. With this operation, all the output signals from the sync signal frequency divider 22 are rest to logic "0", and the output signal Pc2 from the AND gate 23*c* is changed from logic "1" to logic "0". Therefore, the output pulse Po6 from the OR gate 24*d* is changed to logic "0".

In this case, when the synchronization storage circuit 25 receives the output pulse Po6, the designating signal Sc is changed from logic "1" to logic "0", and the designating signal Sa is changed from logic "0" to logic "1". As a result, the synchronization storage state is changed from the state "C" to "A".

In addition, the frequency-divided signal f12 output from the sync signal frequency divider 22, which was reset at the timing t29 and restarted, is changed to logic "1" at a timing t30. As a result, an output signal from the inverter 23*f* is set at logic "0". Since the frequency-divided signals f13, f14, and f15 are at logic "0" at this time, all the input sinals to the NOR gate 23*d* are set at logic "0", and an output signal Pe4 therefrom is set at logic "1". Upon reception of the signal Pe4, the output signal from the OR gate 24*e* of the sync signal forming circuit 24 is changed from logic "0" to logic "1", and the sync pulse Pd is changed from logic "1" to logic "0". Therefore, the switch signal Sd output from the OR gate 34 is changed from logic "1" to logic "0", and the receiving circuit 26*b* stops the receiving operation through the synchronization detecting intermittent driver 26*a*.

At a timing t31 in FIG. 8, since the frequency-divided signals f12 and f14 from the synchronization storage circuit 25 are at logic "0" and the frequency-divided signals f13 and f15 are at logic "1", the output pulse Pa5 from the AND gate 23*a* is changed to logic "1". At this time, since the designating signal Sa from the synchronization storage circuit 25 is at logic "1", the output pulse Pka from the AND gate 24*a* is set at logic "1", and an output pulse Po7 from the OR gate 24*d* is changed to logic "1". As a result, the intermittent sync signal Pd output from the NOR gate 24*f* and the switch signal Sd are set at logic "1", and hence the receiving circuit 26*b* is set in an operative state through the synchronization detecting intermittent driver 26*a*.

In this case, since the interval Ta1 from the timing t29 corresponding to the trailing edge of the radio signal Sr5 to the timing t31 in FIG. 8 is equal to the interval T'a1 in the transmitter 100 in FIG. 6, the transmitter 100 starts transmitting a radio signal Sr6 at the timing t31. As described above, since the receiving circuit 26*b* starts the operation at the timing t31, the radio signal Sr6 received by the antenna 26*d* is demodulated by the receiving circuit 26*b*, and a determining signal Ph6 from the waveshaping circuit 26*c* is set at logic "1".

The duration of the radio signal Sr6 ends at a timing t32 in FIG. 8, and the determining signal Ph6 is changed from logic "1" to logic "0". As a result, the pulse generator 31 generates a reset pulse Pr so as to instantaneously reset the sync signal frequency divider 22 through the OR gate 33, and subsequently restarts it. All the output signals from the divider 22 are then reset to logic "0", and the output signal Pa5 from the AND gate 23*b* is changed from logic "1" to logic "0". Consequently, the output pulse Po7 from the OR gate 24*d* is changed to logic "0".

In this case, when the synchronization storage circuit 25 receives the output pulse Po7, the designating signal Sa is changed from logic "1" to logic "0" ; and the designating signal Sb, from logic "0" to logic "1". As a result, the synchronization storage state is changed from the state "A" to state "B".

In addition, the frequency-divided signal f12 output from the sync signal frequency divider 22, which was reset at the timing t32 and restarted, is changed to logic "1" at a timing t33. Therefore, an output signal from the inverter 23*f* is set at logic "0". At this time, since the frequency-divided signals f13, f14, and f15 are at logic "0", all the input signals to the NOR gate 23*d* are set at logic "0", and an output signal Pe5 therefrom is set at logic "1". When the output signal from the OR gate 24*e* of the sync signal forming circuit 24 is changed from logic "0" to logic "1", the sync pulse Pd is changed from logic "1" to logic "0", and the switch Sd is also changed from logic "1" to logic "0". As a result, the receiving circuit 26*b* stops the receiving operation through the synchronization detecting intermittent driver 26*a*.

The synchronous intermittent operation in the present invention has been described above. In the present invention, the transmission intervals between intermittent signals from the transmitter 100 are cyclically changed in accordance with the synchronization storage state of the synchronization storage circuit 15, and the intervals are automatically detected by the receiver 200, thereby matching the synchronization storage state of the synchronization storage circuit 25 of the receiver 200 with that of the synchronization storage circuit 15 of the transmitter 100.

A synchronization detecting operation upon a change in reception state of the radio signal Sr will be described in detail below with reference to FIGS. 9A and 9B.

Figure 9B:
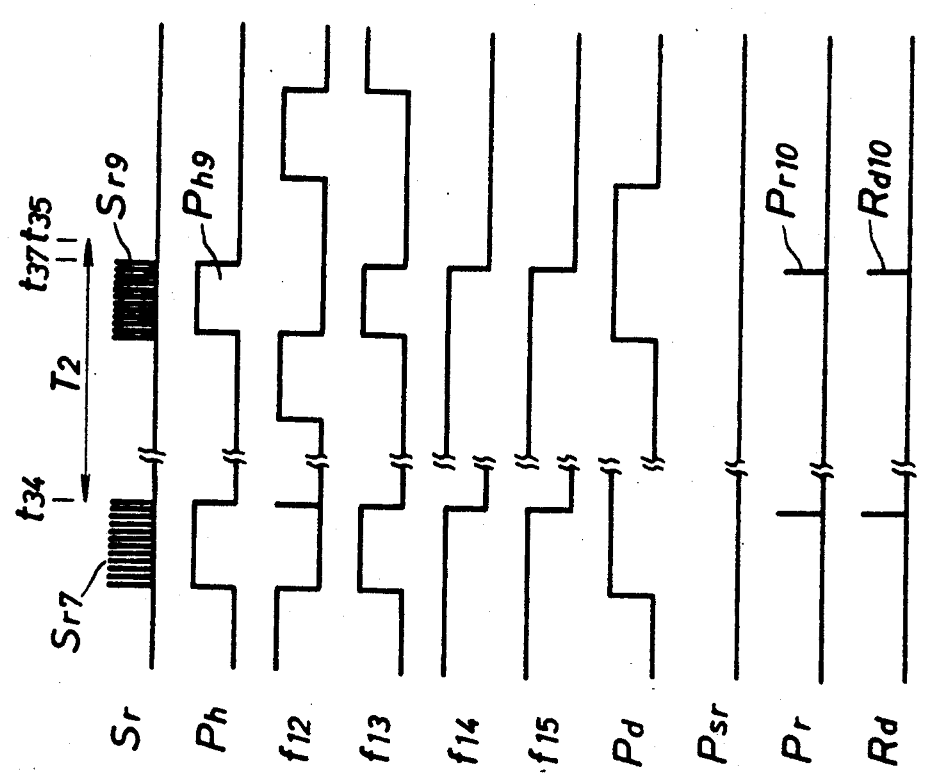
FIG. 9A and 9B are timing charts for explaining a synchronous intermittent operation of the receiver in detail.
Figure 9A:
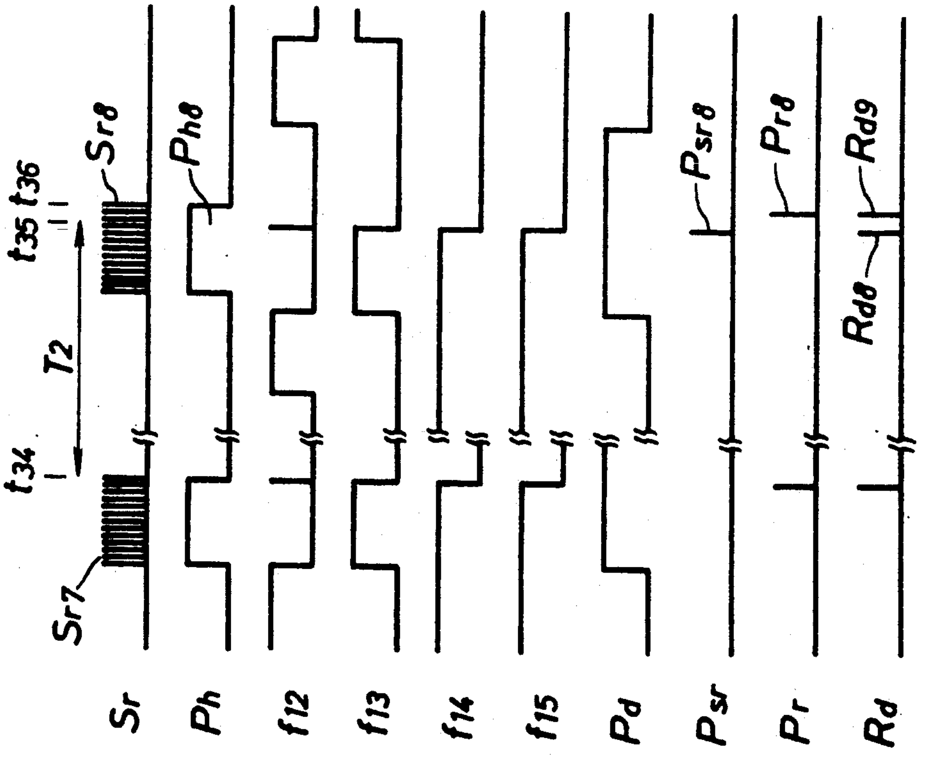

FIG. 9A shows a self-reset operation to be performed when the radio signal Sr is not received at a predetermined timing. More specifically, FIG. 9 is a timing chart showing a case wherein the duration of a radio signal Sr8 does not end at a timing t35 after a predetermined interval T2 from a timing t34 corresponding to the trailing edge of an intermittent radio signal Sr7 due to the influences of delay of the radio signal Sr or the like, but ends at a delayed timing t36.

In this case, the interval T2 is set to be equal to the interval between radio signals S'r7 and S'r8 transmitted from the transmitter 100. In the synchronization storage state "A", the interval T2 is equal to the sum of the interval Ta1 and the time corresponding to the pulse width of the intermittent sync signal Po. In the state "B", the interval T2 is equal to the sum of the interval Tb1 and the time corresponding to the pulse width of the intermittent sync signal Po. In the state "C", the interval T2 is equal to the sum of the interval Tc1 and the time corresponding to the pulse width of the intermittent sync signal Po.

In the sync signal frequency divider 22 in FIG. 4 which is in the process of a frequency dividing operation, the frequency-divided signals f12 and f15 are set at logic "1" at a timing t35 in FIG. 9A and 9B. Since the switch signal Sd and the output from the inverter 37 are at logic "1" at this time as shown in FIG. 7, an output pulse Psr8 from the AND gate constituting the self-reset control circuit 32 is set at logic "1". Therefore, a sync signal frequency division reset signal Rd8 output from the OR gate 33 is set at logic "1" so as to reset the sync signal frequency divider 22. Upon this reset operation, the frequency-divided signals f12 and f15 output from the divider 22 are set at logic "0". As a result, the output signal Psr8 from the self-reset control circuit 32 is restored to logic "0", and the reset signal Rd8 is also set at logic "0". Therefore, the sync signal frequency divider 22 is instantaneously reset, and subsequently resumes the frequency dividing operation. At this time, the frequency-divided signal f15, as a clock input to the asynchronous state detector 29, falls from logic "1" to logic "0". However, since a determining signal Ph8, as an input signal to the reset terminal of the detector 29, is at logic "1", the detector 29 is in a reset state and hence does not perform a counting operation. A self-reset operation is performed in the above-described manner. In this operation, the pulse Psr is generated after the interval T2 from the trailing edge of the received radio signal Sr regardless of the presence/absence of the radio signal Sr, thereby resetting the sync signal frequency divider 22.

When the duration of the radio signal Sr8 ends at the timing t36 in FIG. 9A, the determining signal Ph8 is changed from logic "1" to logic "0", and the pulse generator 31 generates a pulse Pr8 which is instantaneously set at logic "1". As a result, the OR gate 33 outputs a sync signal frequency division reset signal Rd9 so that the sync signal frequency divider 22 is instantaneously reset and subsequently resumes the frequency dividing operation.

In this manner, the divider 22 is reset twice by the pulses Psr8 and Pr8. However, since a synchronization timing is determined by the latter reset operation of the pulse Pr8, no problems are posed. That is, in this embodiment, priority is given to a reset operation of the sync signal frequency divider 22 at the trailing edge of the radio signal Sr8 over a self-reset operation.

FIG. 9B is a timing chart showing a case wherein the duration of a radio signal Sr9 ends at a timing t37 slightly earlier than the timing t35 after the interval T2 from the trailing edge of the radio signal Sr7. When the duration of the radio signal Sr9 ends at the timing t37, a determining signal Ph9 is changed from logic "1" to logic "0". As a result, the pulse generator 31 generates a pulse Pr10 which is instantaneously set at logic "1", and the OR gate 33 outputs a sync signal frequency division reset signal Rd10. With this operation, the sync signal frequency divider 22 is instantaneously reset and subsequently resumes the frequency dividing operation. At the timing t35, therefore, since the frequency-divided signals f12 and f15 are at logic "0", the self-reset control circuit 32 does not output the pulse Psr, and a self-reset operation is not performed. That is, priority is given to the reset operation of the sync signal frequency divider 22 at the trailing edge of the radio signal Sr9.

The above description is made for a synchronizing operation between the transmitter and the receiver when the duration of the radio signal Sr8 ends at the timing t36 slightly later than the timing t35 after the interval t35 from the trailing edge of the radio signal Sr7, and when it ends at the timing t37 slightly earlier than the timing t35. In the former case, the sync signal frequency divider 22 is reset once and is subsequently reset at the trailing edge of the radio signal Sr8, thus performing a synchronizing operation. In the latter case, a synchronizing operation is performed by directly resetting the divider 22 at the trailing edge of the radio signal Sr9. That is, in either of the cases, a synchronizing operation at the trailing edge of the radio signal Sr has priority over a self-reset operation. This operation is to be performed in consideration of the case in which the oscillation frequency of the OSC 11 of the transmitter 100 does not perfectly coincide with that of the OSC 21 of the receiver 200. By performing a synchronizing operation at the trailing edge of the radio signal Sr with priority over a self-reset operation, the transmitter and the receiver can be reliably operated in synchronism with each other even if signals are slightly incoincident with each other.

An operation will be described below with reference to FIG. 10, wherein the receiver 200 cannot receive the radio signal Sr and a synchronizing operation cannot be performed because the transmitter 100 is moved out of the reception range of the receiver 200 or the transmitter 100 is set in an inoperative state and does not transmit the radio signal S'r.

Figure 10:
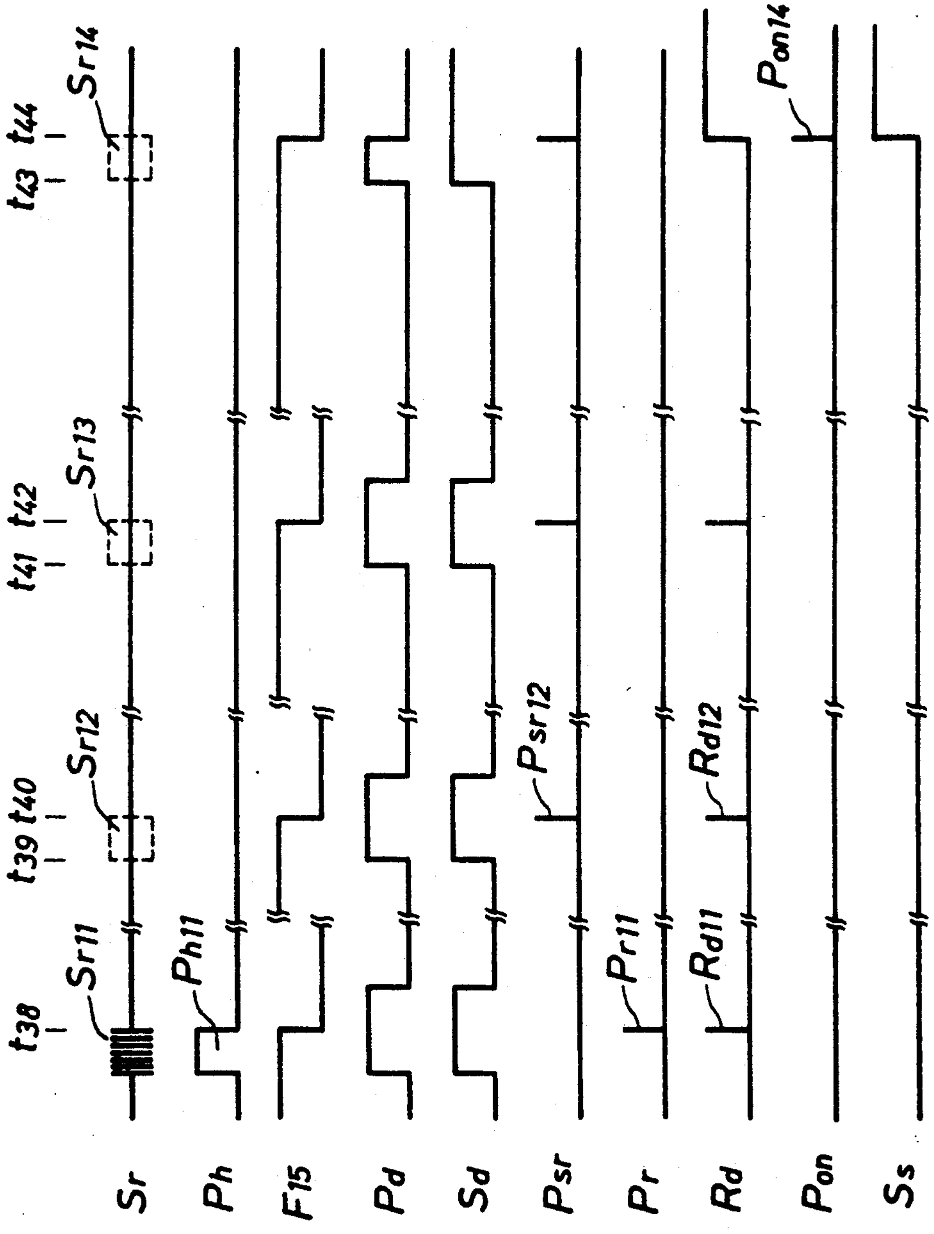
FIG. 10 is a timing chart for explaining a case wherein the receiver cannot perform a synchronous intermittent operation.

FIG. 10 is a timing chart showing a case wherein the receiver 200 receives only one radio signal Sr and cannot receive the subsequent signals. When the duration of a radio signal Sr11 ends at a timing t38 in FIG. 10, a determining signal Ph11 output from the waveshaping circuit 26c is changed from logic "1" to logic "0". The pulse generator 31 then outputs a signal Pr11 to cause the OR gate 33 to output a signal Rd11. As a result, the sync signal frequency divider 22 is instantaneously reset. Upon cancellation of the reset state, the divider 22 resumes the frequency dividing operation, and the above-described synchronous intermittent operation is performed. At this time, since the determining signal Ph11 output from th waveshaping circuit 26c is set at logic "0", the reset state of the asynchronous state detector 29 is canceled. As a result, the frequency-divided signal f15, which was changed from logic "1" to logic "0" when the divider 22 is reset, causes the asynchronous state detector 29 to be incremented by one.

As described above with reference to FIG. 7, both the intermittent sync signal Pd output from the sync signal forming circuit 24 and the switch signal Sd are set at logic "1" at a timing t39 after an interval Ta1 from the timing t38 in FIG. 10. As a result, the synchronization detecting intermittent driver 26a drives the receiving circuit 26b. In this case, although the radio signal Sr is supposed to be received, as a radio signal Sr12, at a position indicated by a dotted line in FIG. 10, the radio signal Sr12 is not received by the receiving circuit 26b because the transmitter 100 is moved out of the reception range of the receiver 200 or the transmitter 100 stops the transmitting operation. As described above with reference to FIG. 9A, when the frequency-divided signals f12 and f15 from the sync signal frequency divider 22 are set at logic "1" at a timing t40 after an interval Ta2 from the timing t38 in FIG. 10, the self-reset control circuit 32 sets a signal Psr12 at logic "1". As a result, the OR gate 33 outputs a signal Rd12 of logic "1" so as to reset the divider 22. At this time, since the radio signal Sr12 is not received and the determining signal Ph is not set at logic "1", the asynchronous state detector 29 is not reset. Subsequently, the asynchronous state detector 29 receives the frequency-divided signal f15 which is changed from logic "1" to logic "0" upon a self-reset operation of the sync signal frequency divider 22, and performs a counting operation, thus incrementing the counter value to 2.

As described above, if the radio signal Sr is not received, the sync signal frequency divider 22 is reset by a self-reset operation, and the asynchronous state detector 29 is incremented by one.

If the radio signal Sr is not received at a timing t41 after an interval Tb1 from the timing 40 in FIG. 10, since the determining signal Ph is kept at logic "0", the sync signal frequency divider 22 is self-reset at a timing t42, and the asynchronous state detector 29 performs the third counting operation.

If the radio signal Sr is not received at a timing t43 after an interval Tc1 from the timing t42 in FIG. 10, since the determining signal Ph is kept at logic "0", the sync signal frequency divider 22 is self-reset at a timing t44, and the asynchronous state detector 29 performs the fourth counting operation. After the fourth counting operation, the signal q3 output from the terminal Q3 is changed from logic "0" to logic "1". As a result, the output signal from the pulse generator 30 in FIG. 4 is instantaneously changed to logic "1". At this time, since the power-on circuit 36 outputs a signal of logic "0", the OR gate 35 outputs an initializing pulse Pon14 of logic "1". Upon reception of this pulse, the continuous mode storage circuit 27 is reset, and the continuous mode signal Ss is changed to logic "1". At the same time, the determination mode storage circuit 28 and the synchronization storage circuit 25 are reset.

In addition, since the continuous mode signal Ss is changed to logic "1", the switch signal Sd output from the OR gate 34 is changed to logic "1", and the receiving circuit **26*b* is set in an operative state through the synchronization detecting intermittent driver 26*a***.

Furthermore, when the continuous mode signal Ss is changed to logic "1", the NOR latch circuit constituted by the NOR gates **24*f* and 24*g* of the sync signal forming circuit 24 is reset through the OR gate 24*e***, and the sync signal Pd is changed to logic "0".

Moreover, when the continuous mode signal Ss is changed to logic "1", the sync signal frequency division reset signal Rd from the OR gate 33 is changed to logic "1". The sync signal frequency divider 22 is reset by the reset signal R, so that the selection gate 23 and the sync signal forming circuit 24 stop the operations.

Since the determination mode storage circuit 28 is reset, the determination mode signal Sh is changed to logic "1", and a signal of logic "0" is supplied to one of the input terminals of the AND gate 32 so as to inhibit a self-reset operation.

As described above, even if the receiver 200 cannot receive the radio signal Sr, it can keep waiting for the subsequent radio signal Sb without a runaway by reapting a self-reset operation in a cycle determined by a current synchronization storage state. The asynchronous state detector 29 counts the number of self-reset operations, i.e., the number of radio signals Sr which cannot be received. When the count value becomes 4, the detector 29 sets the output q3 at logic "1".

The continuous mode storage circuit 27 is reset by the output signal q3, and the synchronous intermittent mode is switched to the continuous mode. As a result, the sync signal frequency divider 22 is held in the reset state, and the receiving circuit **26*b* starts a continuous operation. At this time, an alarm signal is output from the buzzer driver 35 in response to the continuous mode signal Ss of logic "1" so as to cause the buzzer 36** to generate an alarm.

In addition, since the determination mode storage circuit 28 is reset by the output signal q3, a self-reset operation is inhibited.

The operation of the present invention has been described above. The operation is divided into four modes, i.e., (1) an initialization mode, (2) a synchronization detecting mode, (3) an intermittent synchronization mode, and (4) an unidentified state mode, as follows:

(1) Initialization Mode

This mode is a mode prior to a normal operation after the power source switch of the transmitter/receiver apparatus of the present invention is turned on.

Upon turning on the power source switch, the mode switching circuit 41 is reset and the continuous mode signal Ss is set at logic "1". Then, the synchronization determining circuit 26 is continuously operated while the synchronization detector 40 is kept in a reset state.

(2) Synchronization Detecting Mode

This mode is a mode for detecting which one of the three radio signals constituting one cycle a received radio signal is.

The reset state of the mode switching circuit 41 is canceled by the first determining signal Ph1 from the synchronization determining circuit 26, and the continuous mode signal Ss is set at logic "0". Then, the reset state of the synchronization detector 40 is canceled and the detector 40 is operated to sequentially output the intermittent sync signals Poa, Pob, and Poc. The synchronization determining circuit 26 is then operated by the intermittent sync signals Poa to Poc.

The synchronization detector 40 stores the order of synchronization by detecting a coincidence between the second determining signal Ph2 from the synchronization determining circuit 26 and the intermittent sync signals Poa to Poc.

(3) Intermittent Synchronization Mode

The synchronization detector 40 generates the intermittent sync signals Poa, Pob, Poc; Poa, Pob, . . . in synchronism with the determining signals Ph3, Ph4, . . . from the synchronization determining circuit 26, and intermittently drives the synchronization determining circuit 26.

(4) Unidentified State Mode

Upon detecting that the determining signal Ph from the synchronization determining circuit 26 which is operated in the intermittent synchronization mode is not received for a predetermined period of time, the asynchronous state detector 29 generates an identified state signal q3 so as to generate an alarm. At the same time, the mode switching circuit 41 is reset, and the operation mode is shifted to the initialization mode. If the unidentified state signal q3 is continuously output, the initializing pulse Pon is kept at logic "1". As a result, the continuous mode signal Ss of logic "1" is output from the modes switching circuit 41. With this operation, a missing article alarming sound is generated from the buzzer 36 through the buzzer driver 35.

Figure 12:
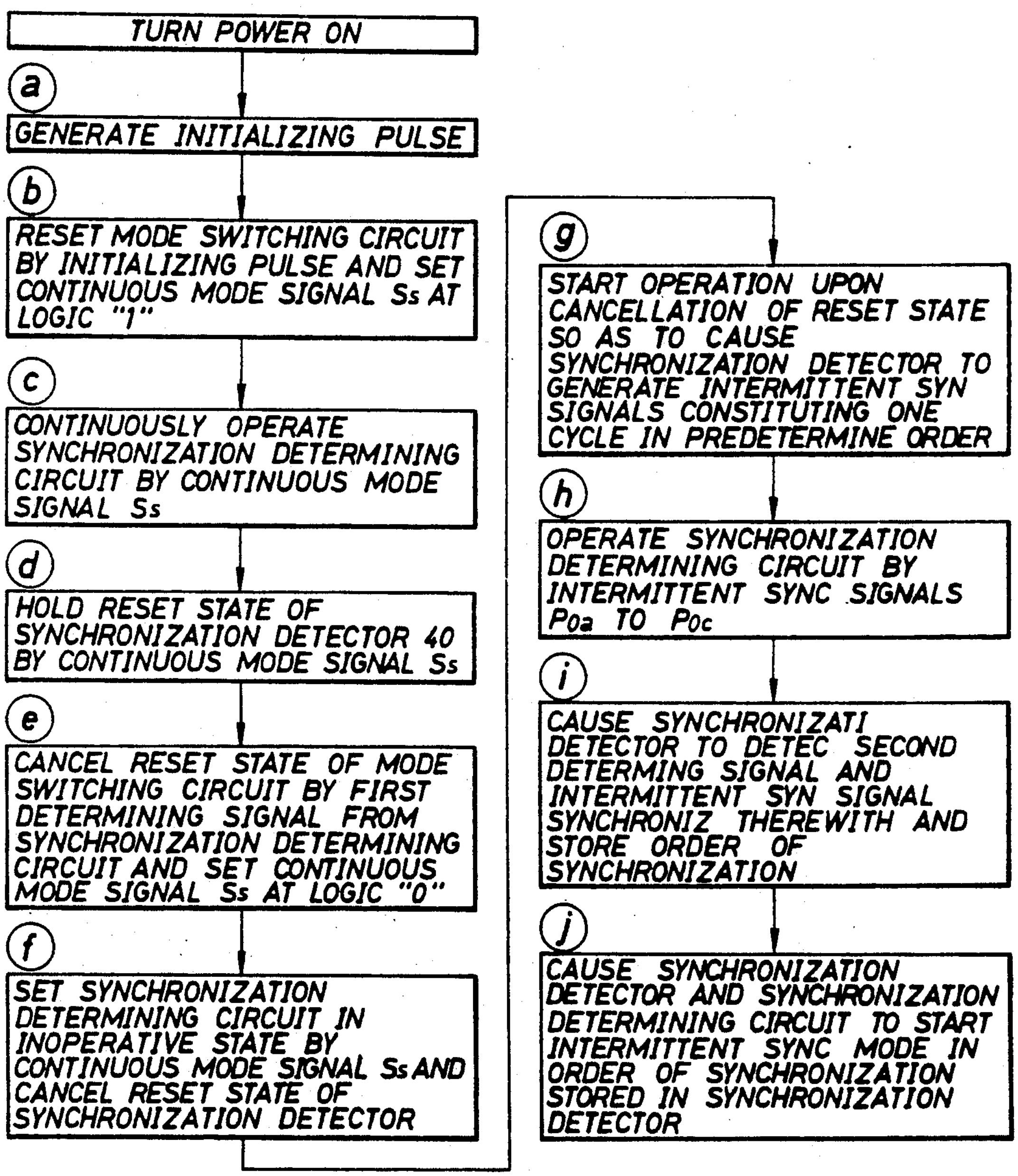
FIG. 12 is a flow chart showing a characteristic feature of the present invention of circuit operations of the receiver in FIG. 4.

Of the above-described modes (1) to (4), (1) the initialization mode and (2) the synchronization detecting mode which represent the characteristic features of the present invention better than the other modes are shown in FIG. 12.

Figures 11A, 11B, 11C, 11D:
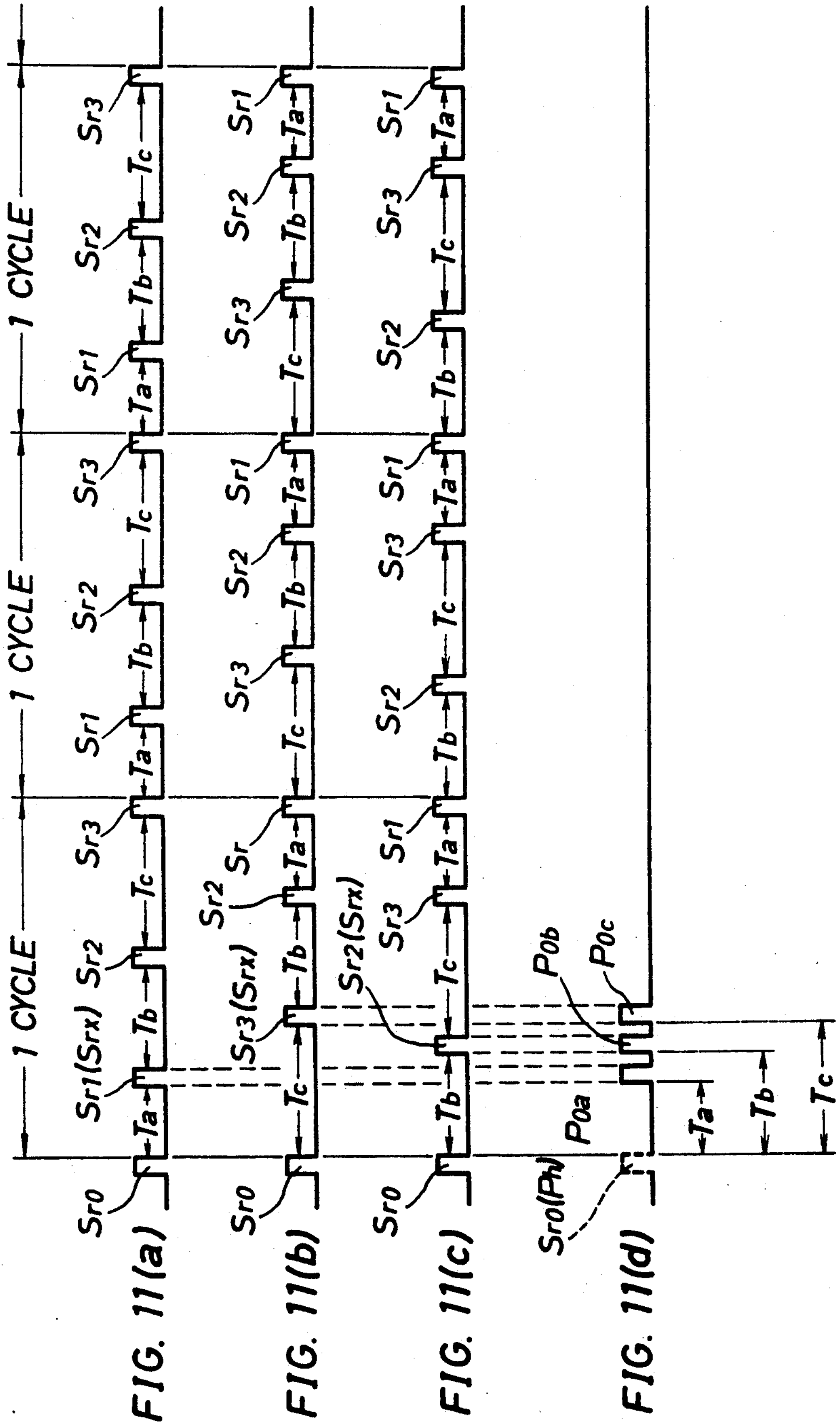
FIGS. 11(*a*) to 11(*d*) are timing charts respectively showing different waveforms of intermittent radio signals used in the present invention.

In the above-described embodiment, the intervals of the radio signals Sr transmitted from the transmitter, i.e., the intervals Ta, Tb, and Tc of the intermittent signals P'o, are set to be Ta<Tb<Tc, and the transmission mode is set such that the intervals of the three radio signals Sr1, Sr2, and Sr3 constituting one cycle are repeated in the order of Ta, Tb, and Tc. However, different transmission modes may be set. FIGS. 11(*a*) to 11(*c*) show various types of transmission modes. FIG. 11(*d*) shows an intermittent sync signal to be output from the receiver in the synchronization detecting mode. FIG. 11(*a*) shows a transmission mode in which the intervals of the radio signals are repeated in the order of Ta, Tb, and Tc, as in the embodiment. FIG. 11(*b*) shows a transmission mode in which the intervals are repeated in the order of Tc, Tb, and Ta. FIG. 11(*c*) shows a transmission mode in which the intervals are repeated in the order of Ta, Tc, and Tb. Any one of the transmission modes requires one synchronization storage circuit 15 for generating designating signals S'a, S'b, and S'c in the order of repetition of the intervals corresponding to each of the transmission modes shown in FIGS. 11(*a*) to 11(*c*).

On the other hand, the receiver requires one synchronization storage circuit 25 for an intermittent synchronous operation, which is designed to output intermittent sync signals Po at timings corresponding to those of the designating signals S'a, S'b, and S'c from the synchronization storage circuit 15 of the transmitter. In addition to the synchronization storage circuit 25, the receiver requires an initial synchronization matching pulse generating means.

As described above with reference to the flow chart, in the synchronization detecting mode, the receiver must detect which one of the three radio signals Sr1, Sr2, and Sr3 constituting one cycle a received radio signal is.

An initial synchronization matching circuit (to be referred to as an SDC hereinafter) is required to perform this operation. The SDC comprises: an initial synchronization matching pulse generating means for sequentially outputting initial sync pulses Poa, Pob, and Poc in the order of shorter intervals, i.e., intervals Ta, Tb, and Tc with respect to the trailing edge of a radio signal Sro which is received first after the initialization mode is set as shown in FIG. 11(*d*); and a coincidence detecting means for detecting which one of the intermittent sync signals Poa, Pob, and Poc a second radio signal Srx coincides with so as to determine which one of the signals Sr1, Sr2, and Sr3 the signal Srx is. The synchronization storage circuit 25 is initialized in accordance with the type of second radio signal detected by the coincidence detecting means so that the intermittent synchronization mode is subsequently performed in the order of synchronization determined by the synchronization storage circuit 25.

For example, FIG. 11(*a*) shows a case wherein the second signal Srx coincides with the signal Poa. FIGS. 11(*b*) and 11(*c*) show cases wherein the signal Srx coincides with the signals Poc and Pob, respectively.

More specifically, in FIG. 11(*a*), since the signal Srx is the signal Sr1, the synchronization storage circuit is initialized such that the next intermittent sync signal is generated after the interval Tb. Subsequently, the synchronization storage circuit generates intermittent sync signals in the order of Tb, Tc, Ta, Tb, . . . .

In FIG. 11(*b*), since the signal Srx is the signal Sr3, the synchronization storage circuit is initialized such that the next intermittent sync signal is generated after the interval Tb. Subsequently, the synchronization storage circuit generates intermittent sync signals in the order of Tb, Ta, Tc, Tb, . . . .

In FIG. 11(*d*), since the signal Srx is the signal Sr2, the synchronization storage circuit is initialized such that the next intermittent sync signal is generated after the interval Tc. Subsequently, the synchronization storage circuit generates intermittent sync signals in the order of Tc, Ta, Tb, Tc, . . . .

As described above, the receiver requires the initial synchronization matching pulse generating means for generating the initial sync pulse shown in FIG. 11(*d*), and the synchronization storage circuit 25 for generating intermittent sync signals. However, in the transmission mode shown in FIG. 11(*a*) in the embodiment, since initial sync pulses and intermittent sync pulses are respectively generated by the initial synchronization matching pulse generating means and the synchronization storage circuit 25 in the same order, the synchronization storage circuit can be also used to perform the function of the initial synchronization matching pulse generating means. In the transmission modes shown in FIGS. 11(*b*) and 11(*c*), however, since these pulses are generated in different orders, the initial synchronization matching pulse generating means and the synchronization storage circuit 25 must be independently arranged.

In the above embodiment, the number of radio signals constituting one cycle is three. However, the present invention is not limited to this but more than three signals may be used. With an increase in number of signals, radio interference can be more effectively prevented.

The transmitter/receiver apparatus of the present invention can be applied to a missing child alarming apparatus, a telemeter, a pocket bell, and the like as well as the missing article alarming apparatus exemplified above.

As has been described above, according to the transmitter/receiver apparatus of the present invention, in the intermittent synchronization system, the intervals between intermittent radio signals are cyclically changed. This greatly reduces the probability of radio interference trouble based on the periodic characteristics of intermittent radio signals such that a given intermittent signal is liable to radio interference with an intermittent signal having a period of an integer multiple or an integer part of the period of the given intermittent signal as in the conventional apparatus in which transmission/reception is performed by using intermittent signals having predetermined periods. Therefore, even if a large number of transmitter/receiver apparatuses having the same frequency are simultaneously used close to each other, since the probability of radio interference is very low, excellent performance can be expected.

In addition, when the transmitter/receiver apparatus of the present invention is started, the receiver sequentially outputs intermittent sync signals in the order of shorter intervals with respect to the trailing edge of a radio signal received first from the transmitter, thereby performing a synchronization detecting operation with respect to the second radio signal from the transmitter. Therefore, the reception timing of the receiver can be instantaneously synchronized with a radio signal transmitted from the transmitter regardless of the timing at which the transmitter/receiver apparatus is started. Hence, a very practical transmitter/receiver apparatus can be provided.

What is claimed is:

1. A transmitter/receiver apparatus comprising:

(a) a transmitter including an intermittent signal generator for generating an intermittent signal, said intermittent signal generator comprising an oscillator, a frequency divider for frequency-dividing an oscillation output from said oscillator at predetermined frequency division ratios, a selection gate for selecting a plurality of pulse signals having different periods by using frequency-divided signals from said frequency divider, and an intermittent signal forming circuit for receiving the plurality of pulse signals from said selection gate and outputting intermittent signals whose intervals cyclically change in a predetermined order, said intermittent signal having pulses with different but cyclically repeated intervals, and an intermittent modulator for outputting an intermittently modulated signal, as a radio signal, which is obtained by intermittently modulating a carrier on the basis of the intermittent signal; and (b) a receiver including a synchronization determining circuit, having a receiving circuit for receiving the radio signal from said transmitter and outputting a demodulated signal, for detecting the demodulated signal and outputting a determining signal, and a synchronization detector for generating an intermittent sync. signal having the same period as that of the intermittent signal from said transmitter, and detecting synchronization operation with respect to the intermittent signal from said transmitter on the basis of the intermittent sync. signal and the determining signal from said synchronization determining circuit, wherein said intermittent signal generator of said transmitter generates intermittent signals having different but cyclically repeated intervals.

2. An apparatus according to claim 1, wherein said frequency divider comprises a sync. frequency divider which is instantaneously reset by an intermittent signal, and said selection gate is designed to selectively output a plurality of pulse signals having different periods on the basis of frequency-divided signals which are output at a timing when or after said sync. frequency divider is reset.

3. An apparatus according to claim 1, wherein said intermittent signal forming circuit comprises a synchronization storage circuit having a plurality of intermittent signal designating terminals for outputting designating signals corresponding to the plurality of pulse signals having different periods output from said selection gate, and a plurality of gates for receiving the plurality of pulse signals having different periods output from said selection gate and the designating signals output from said plurality of intermittent signal designating terminals of said synchronization storage circuit, said plurality of gates outputting only pulses of a plurality of input pulse signals, that are designated by the designating signals as intermittent signals.

4. An apparatus according to claim 3, wherein said synchronization storage circuit comprises a clock terminal for receiving an intermittent signal, and a cyclic designating circuit for cyclically switching an output order of designating signals output from said intermittent signal designating terminals on the basis of the intermittent signal input to said clock terminal.

5. An apparatus according to claim 1, wherein said synchronization detector comprises an oscillator, a frequency divider for frequency-dividing an oscillation output from said oscillator at predetermined frequency division ratios, a selection gate for selecting a plurality of pulse signals having different periods by using frequency-divided signals from said frequency divider, and a sync signal forming circuit for receiving the plurality of pulse signals from said selection gate and outputting intermittent sync signals whose intervals cyclically change in a predetermined order.

6. An apparatus according to claim 5, wherein said synchronization detector further comprises a pulse width increasing circuit for increasing a pulse width of an intermittent sync. signal output from said sync. signal forming circuit.

7. An apparatus according to claim 5, wherein said frequency divider comprises a sync. frequency divier which is instantaneously reset by a determining signal, and said selection gate is designed to selectively output a plurality of pulse signals having different periods on the basis of frequency-divided signals which are output at a timing when or after said sync. frequency divider is reset.

8. An apparatus according to claim 5, wherein said sync signal forming circuit comprises a synchronization storage circuit having a plurality of intermittent signal designating terminals for outputting designating signals corresponding to the plurality of pulse signals having different periods output from said selection gate, and a plurality of gates for receiving the plurality of pulse signals having different periods output from said selection gate and the designating signals output from said plurality of intermittent signal designating terminals of said synchronization storage circuit, said plurality of gates outputting only pulses of a plurality of input pulse signals that are designated by the designating signals as intermittent sync. signals.

9. An apparatus according to claim 8, wherein said synchronization storage circuit comprises a clock terminal for receiving an intermittent signal, and a cyclic designating circuit for cyclically switching an output order of designating signals output from said intermittent signal designating terminals on the basis of the intermittent sync. signal input to said clock terminal.

10. A method of detecting initial synchronization of a transmitter/receiver comprises the steps of:

(a) generating an initializing pulse;

(b) resetting a mode switching circuit by the initializing pulse, and outputting a continuous mode signal;

(c) detecting a radio signal which is output from a transmitter in response to the continuous mode signal, continuously operating a synchronization determining circuit for outputting a determining signal, and holding a synchronization detector in a reset state;

(d) canceling the reset state of said mode switching circuit and stopping output of the continuous mode signal by a first determining signal from said synchronization determining circuit;

(e) setting said synchronization determining circuit in an inoperative state and canceling the reset state of said synchronization detector upon stop of the continuous mode signal;

(f) starting a cyclic designating operation upon cancellation of the reset state so as to cause said synchronization detector to output a plurality of intermittent sync signals included in one cycle in a predetermined order;

(g) operating said synchronization determining circuit in response to the intermittent sync signal;

(h) causing said synchronization detector to store an order of synchronization by detecting a second determining signal and an intermittent sync signal synchronized therewith; and (i) causing said synchronization detector and said synchronization determining circuit to start an intermittent synchronization mode in the order of synchronization stored in said synchronization detector.

11. A method according to claim 10, wherein the step (f) comprises causing said synchronization detector to sequentially output intermittent sync signals in the order of shorter intervals.

* * * * *